United States Patent
Umeda

(10) Patent No.: US 11,120,302 B2
(45) Date of Patent: *Sep. 14, 2021

(54) DATA GENERATION APPARATUS, DATA GENERATION METHOD, AND NON-TRANSITORY COMPUTER-READABLE STORAGE MEDIUM FOR STORING PROGRAM

(71) Applicant: FUJITSU LIMITED, Kawasaki (JP)

(72) Inventor: Yuhei Umeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 90 days.

This patent is subject to a terminal disclaimer.

(21) Appl. No.: 16/554,886

(22) Filed: Aug. 29, 2019

(65) Prior Publication Data

US 2019/0385020 A1 Dec. 19, 2019

Related U.S. Application Data

(63) Continuation of application No. PCT/JP2018/007041, filed on Feb. 26, 2018.

(30) Foreign Application Priority Data

Mar. 3, 2017 (JP) .............................. JP2017-040325

(51) Int. Cl.
*G06K 9/00* (2006.01)
*G06K 9/62* (2006.01)
*G06N 20/00* (2019.01)

(52) U.S. Cl.
CPC ......... *G06K 9/6256* (2013.01); *G06K 9/6268* (2013.01); *G06N 20/00* (2019.01)

(58) Field of Classification Search
CPC ..... G06K 9/6256; G06K 9/6268; G06N 20/00
See application file for complete search history.

(56) References Cited

U.S. PATENT DOCUMENTS

| 5,168,262 A | 12/1992 | Okayama |
| 7,720,275 B2 | 5/2010 | Shibuya et al. |

(Continued)

FOREIGN PATENT DOCUMENTS

| JP | 02-151997 | 6/1990 |
| JP | 2002-032103 | 1/2002 |

(Continued)

OTHER PUBLICATIONS

"Time-series Deep Learning: New AI Technology that Supports Safe Human Lives", Fujitsu Ltd., Mar. 10, 2016, [online], [retrieved on Dec. 1, 2016], Internet: <URL: http://journal.jp.fujitsu.com/2016/03/10/01/> English Translation (10 pages).
Umeda Yuhei, "What the Shape of Data Tells—Topological Data Analysis and Its Application—", Information Processing Society of Japan, vol. 57, No. 11, pp. 1122-1127, ISSN 0447-8053, Oct. 15, 2016, Cited in ISR for PCT/JP2018/007041 (Category A) (6 pages).

(Continued)

*Primary Examiner* — Ping Y Hsieh
*Assistant Examiner* — Xiao Liu
(74) *Attorney, Agent, or Firm* — Fujitsu Patent Center

(57) ABSTRACT

A method includes: executing a first generation process that includes generating a Betti number series corresponding to a contribution rate by performing persistent homology processing on a first point set, the first point set being generated by using a plurality of pieces of time series data and the contribution rate of each of the plurality of pieces of time series data, each of points included in the first point set being represented by coordinates; executing a second generation process that includes generating a characteristic image from a plurality of the Betti number series, the plurality of Betti number series being generated by performing the first generation process on each of the plurality of contribution rates; and executing a third generation process that includes generating machine learning data in which the characteristic image and a classification corresponding to the plurality of pieces of time series data are associated with each other.

9 Claims, 40 Drawing Sheets

(56) References Cited

U.S. PATENT DOCUMENTS

| | | | |
|---|---|---|---|
| 7,987,150 | B1 | 7/2011 | Luu et al. |
| 9,430,688 | B1* | 8/2016 | Ray .................... G06K 9/38 |
| 2005/0021303 | A1 | 1/2005 | Matsushita et al. |
| 2007/0036434 | A1* | 2/2007 | Saveliev ................ G06K 9/52 |
| | | | 382/173 |
| 2007/0192066 | A1 | 8/2007 | Ide |
| 2008/0058977 | A1 | 3/2008 | Honda |
| 2011/0264404 | A1 | 10/2011 | Yanai |
| 2013/0045545 | A1 | 2/2013 | Lee et al. |
| 2017/0147946 | A1* | 5/2017 | Umeda .................. G06N 7/08 |
| 2019/0228516 | A1* | 7/2019 | Umeda ................. G01N 21/00 |

FOREIGN PATENT DOCUMENTS

| | | | |
|---|---|---|---|
| JP | 2004-310500 | | 11/2004 |
| JP | 2007-108998 | | 4/2007 |
| JP | 2017-097643 | | 6/2017 |
| JP | 2018092349 | A * | 6/2018 |
| WO | 2016/090044 | A1 | 6/2016 |

OTHER PUBLICATIONS

International Search Report, mailed in connection with PCT/JP2018/007041 and dated May 22, 2018 (1 page).

Ming-Ju Wu et al., "Wafer Map Failure Pattern Recognition and Similarity Ranking for Large-Scale Data Sets", IEEE Transactions on Semiconductor Manufacturing, vol. 28, No. 1, pp. 1-12, Feb. 2015 (12 pages).

International Search Report attached with the Written Opinion of the International Searching Authority, mailed in connection with PCT/JP2018/004180 and dated Apr. 3, 2018, with partial English translation (10 pages).

Fatima Adly et al., "Machine-Learning-Based Identification of Defect Patterns in Semiconductor Wafer Maps: An Overview and Proposal", Parallel & Distributed Processing Symposium Workshop (IPDPSW), 2014 IEEE International, [Online], IEEE, Dec. 4, 2014 (date of receipt), pp. 420-428, [search date Mar. 27, 2018] Internet: <URL:http://ieeexplore.ieee.org/document/6969418/> (11 pages). Cited in ISR.

Notice of Allowance dated Jan. 6, 2021 for related U.S. Appl. No. 16/376,107 (allowed).

* cited by examiner

FIG. 4
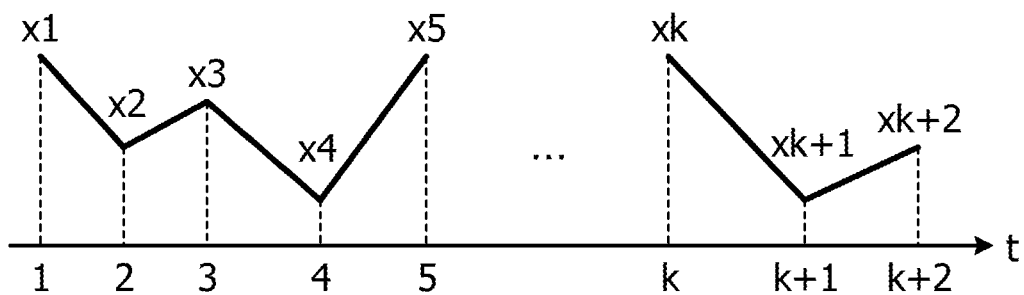
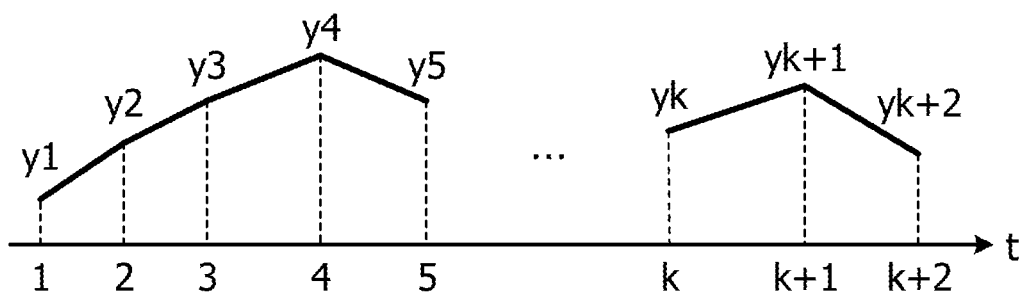

FIG. 5

| α |
|---|
| 0.0 |
| 0.1 |
| 0.2 |
| 0.3 |
| 0.4 |
| ⋮ |
| 1.0 |

RADIUS

FIG. 8

| DIMENSION | OCCURRENCE RADIUS | ANNIHILATION RADIUS |
|---|---|---|
| 1 | 0.10 | 0.12 |
| 1 | 0.11 | 0.14 |
| 1 | 0.12 | 0.13 |
| 1 | 0.12 | 0.15 |
| ⋮ | ⋮ | ⋮ |

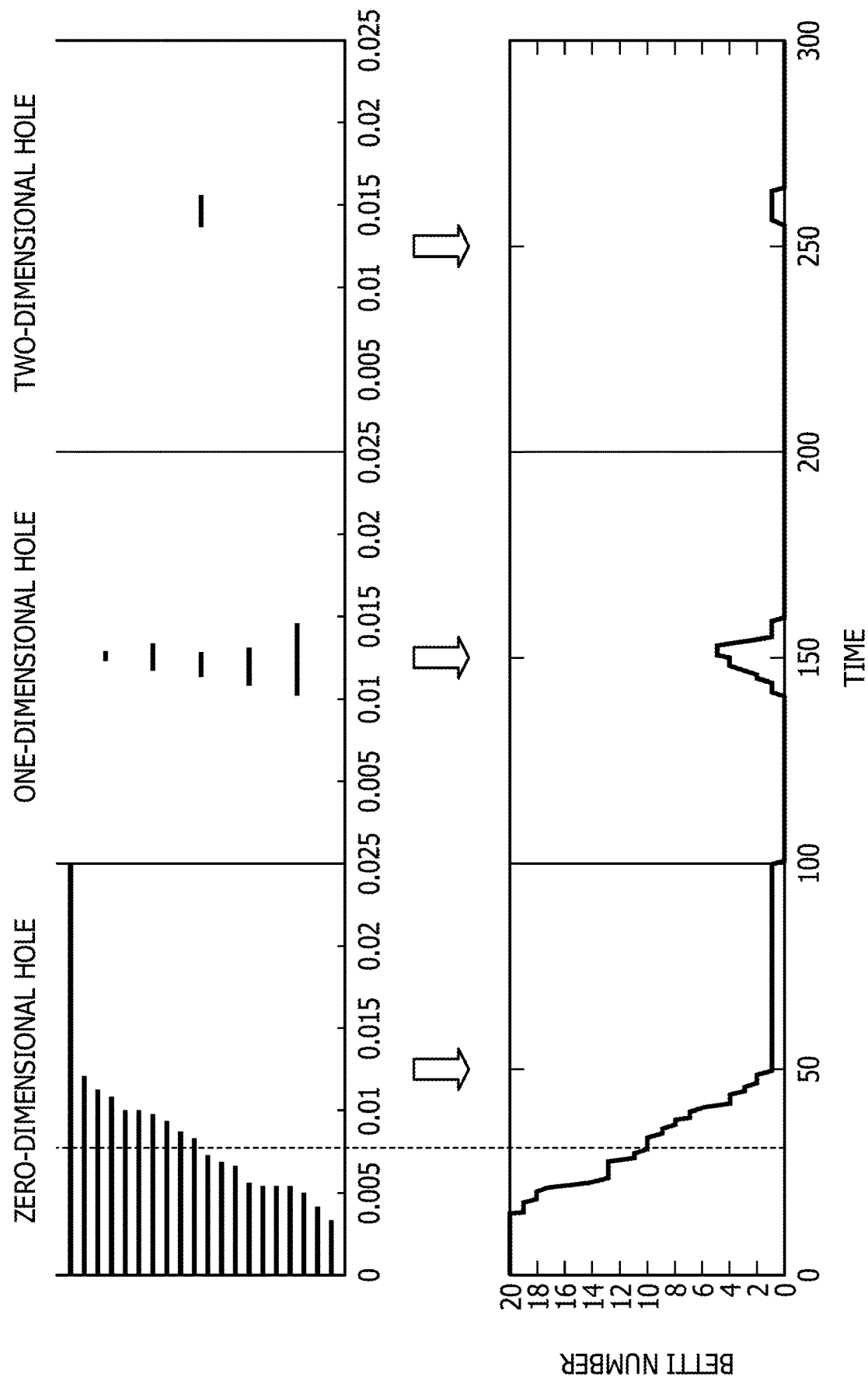

FIG. 21
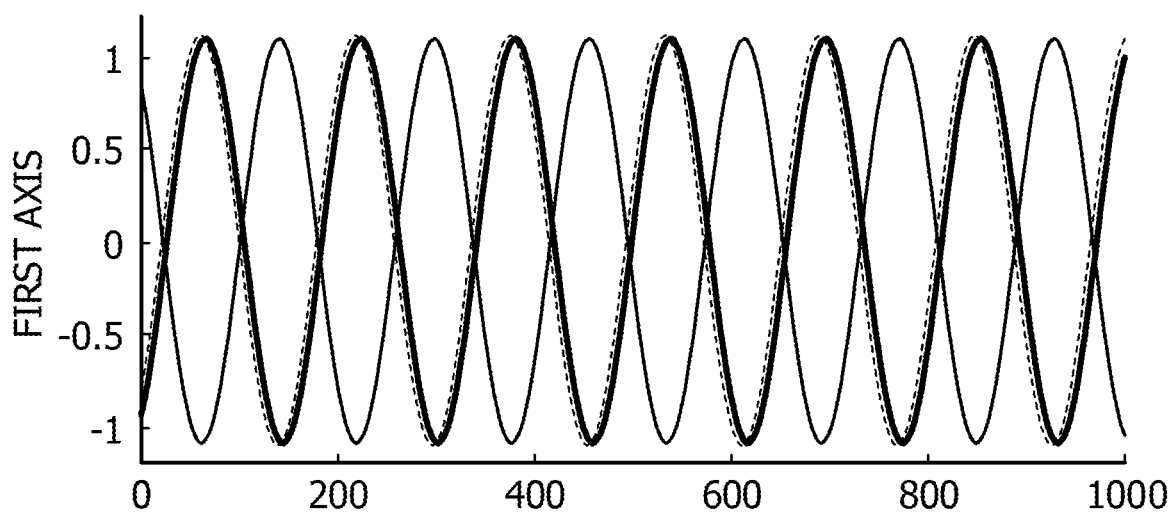
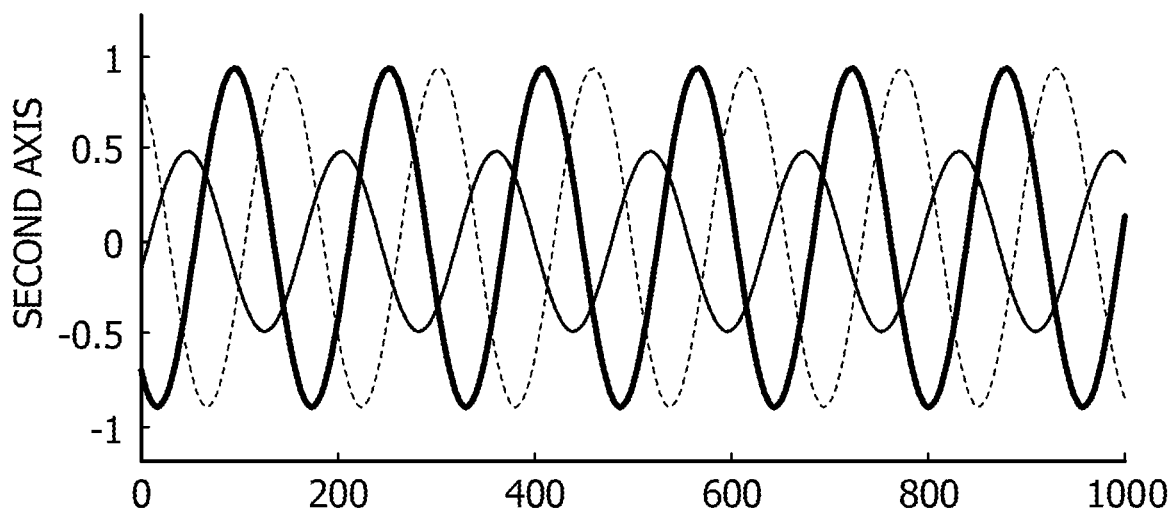

FIG. 22
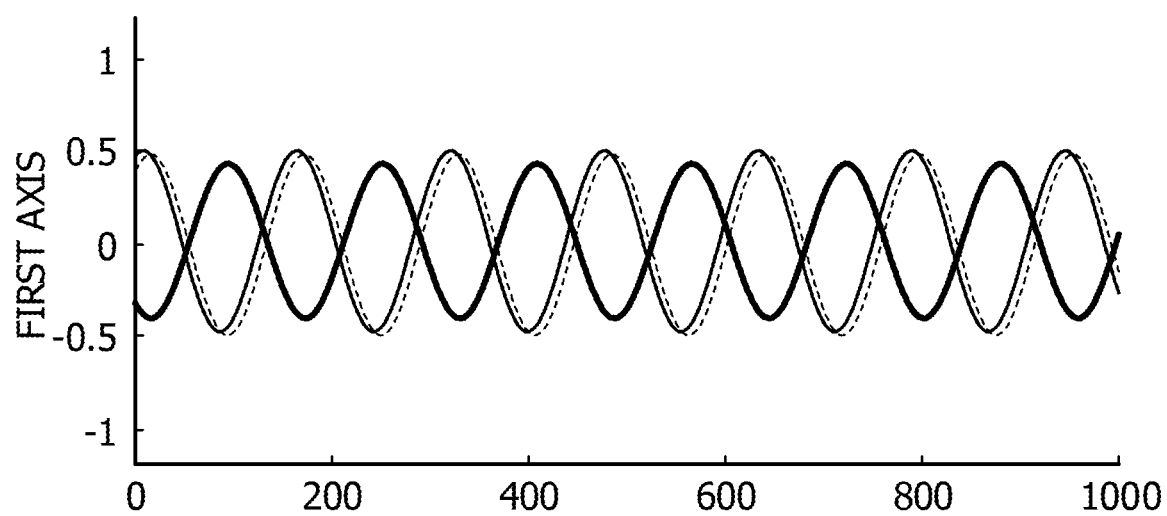
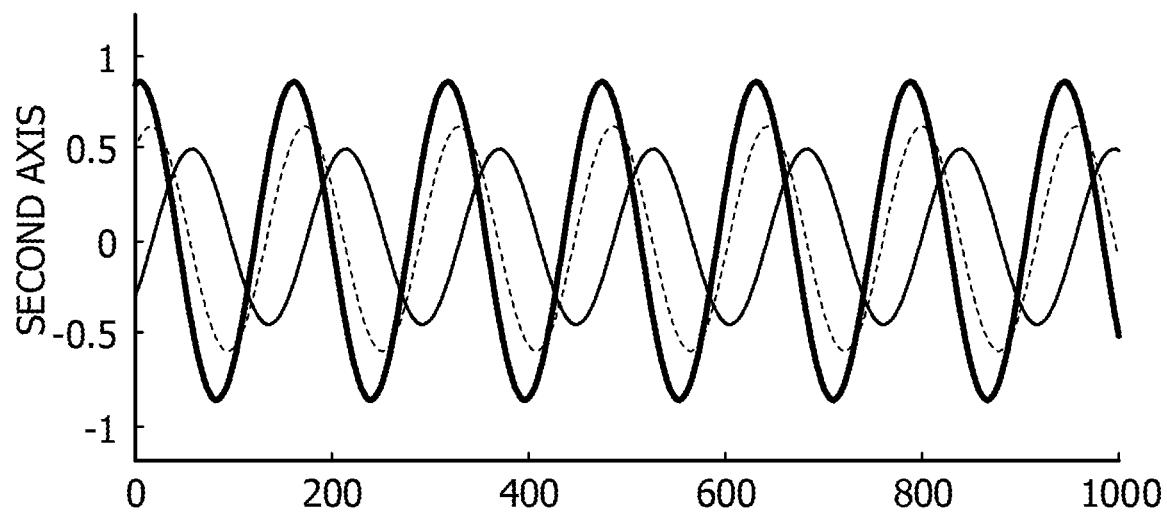

FIG. 23
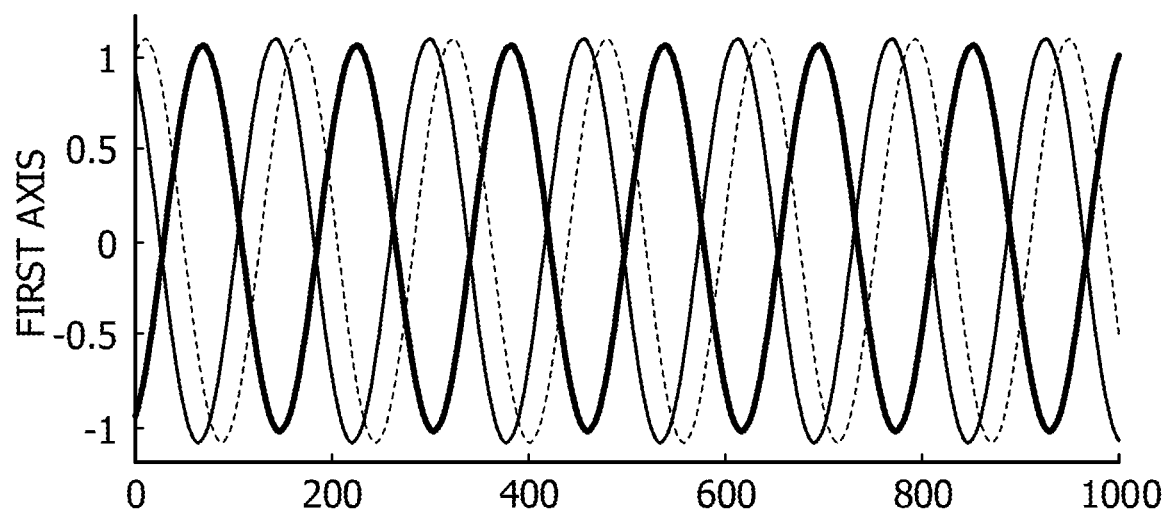
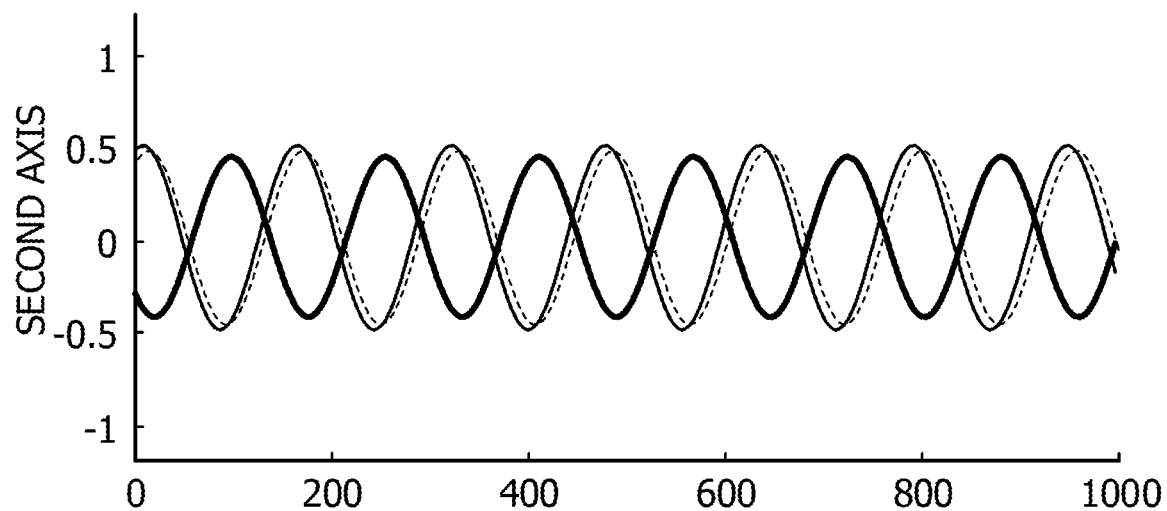

FIG. 24
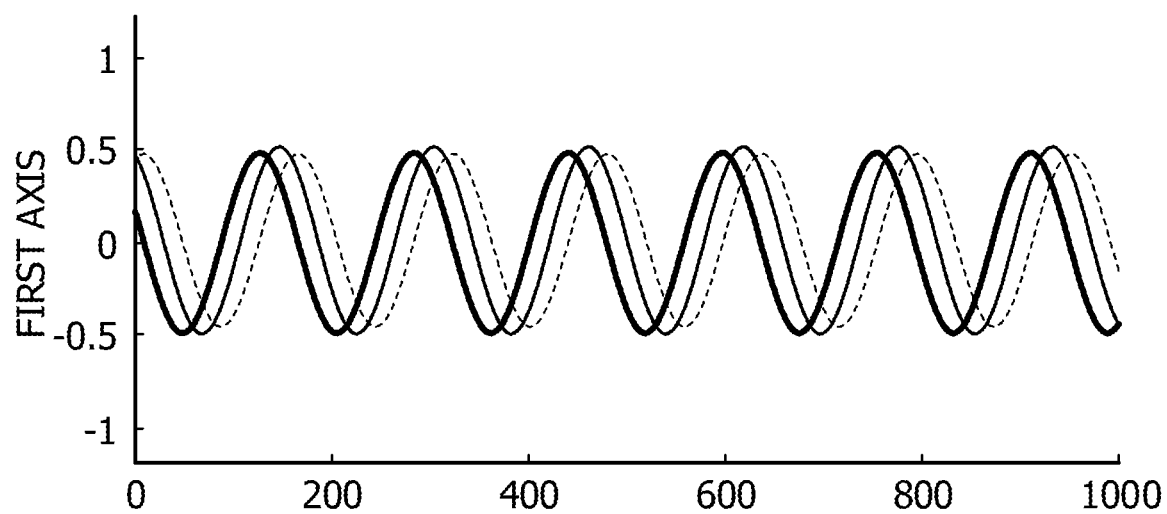
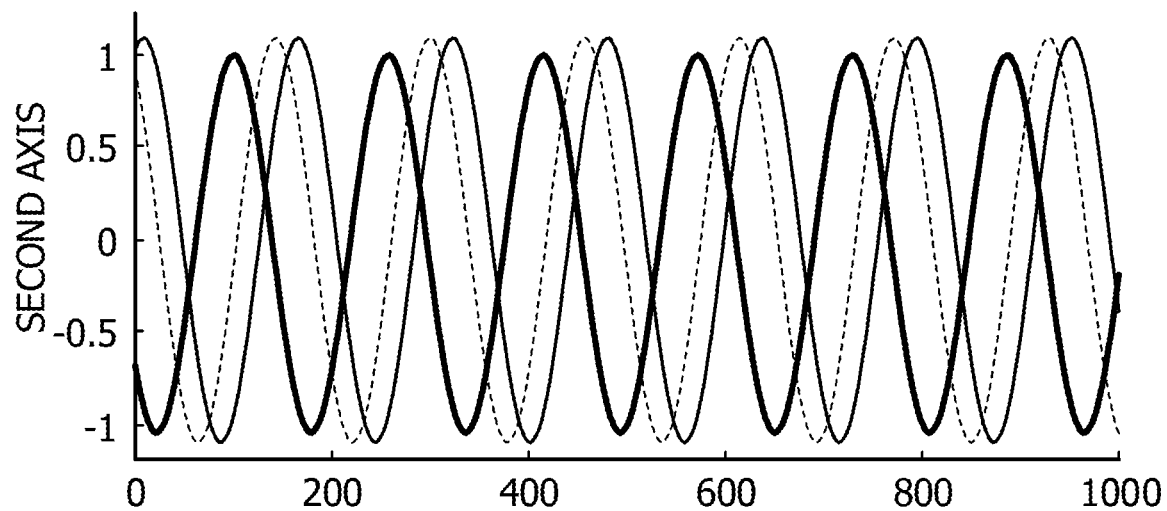

FIG. 25
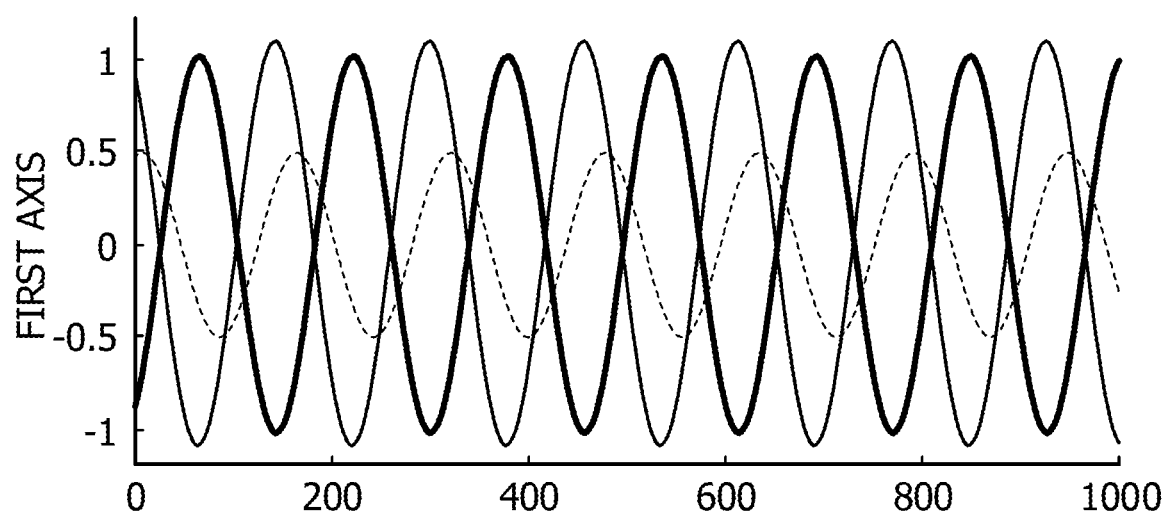
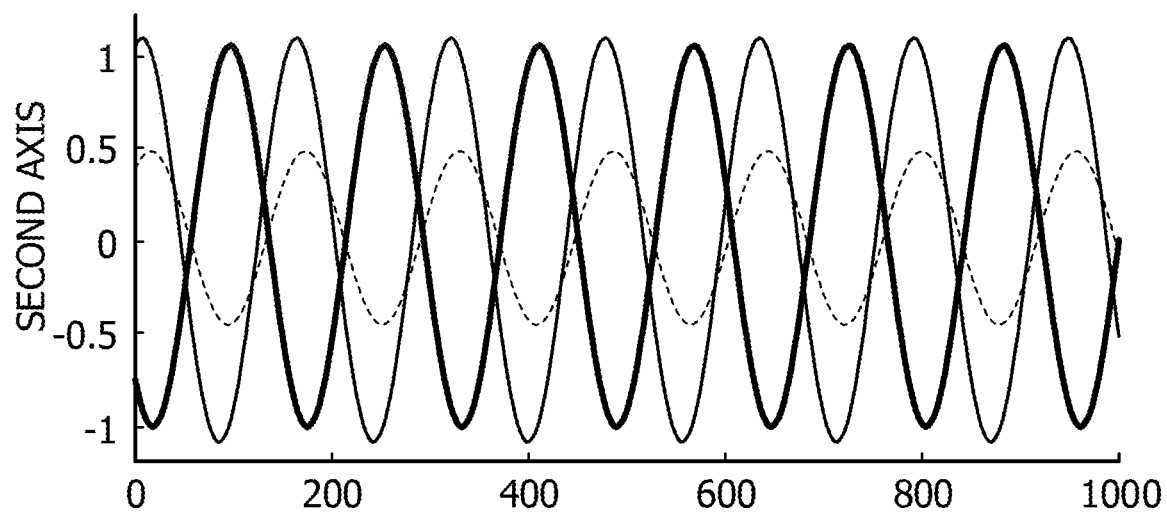

FIG. 26
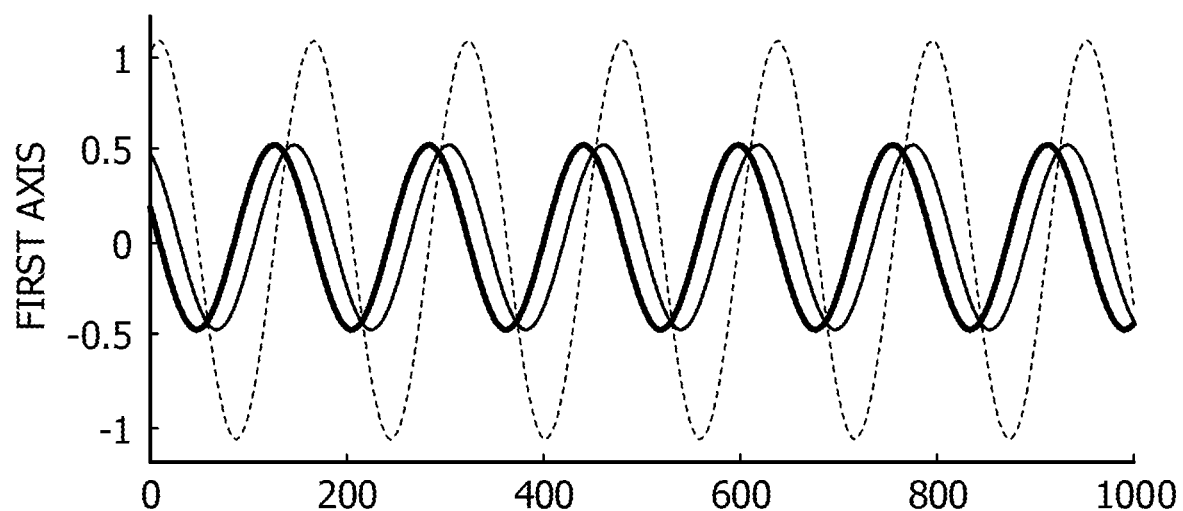
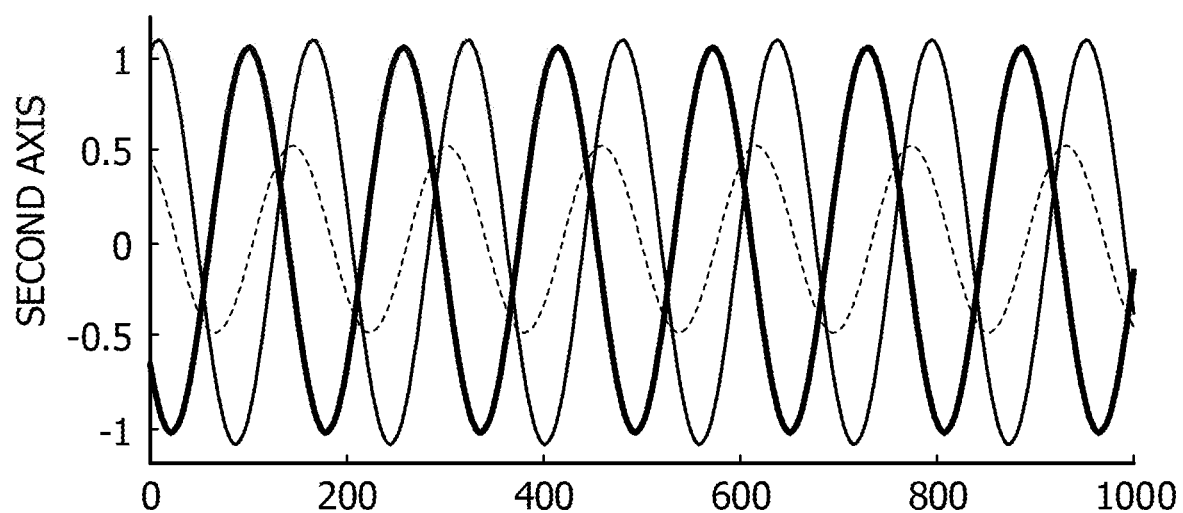

FIG. 27
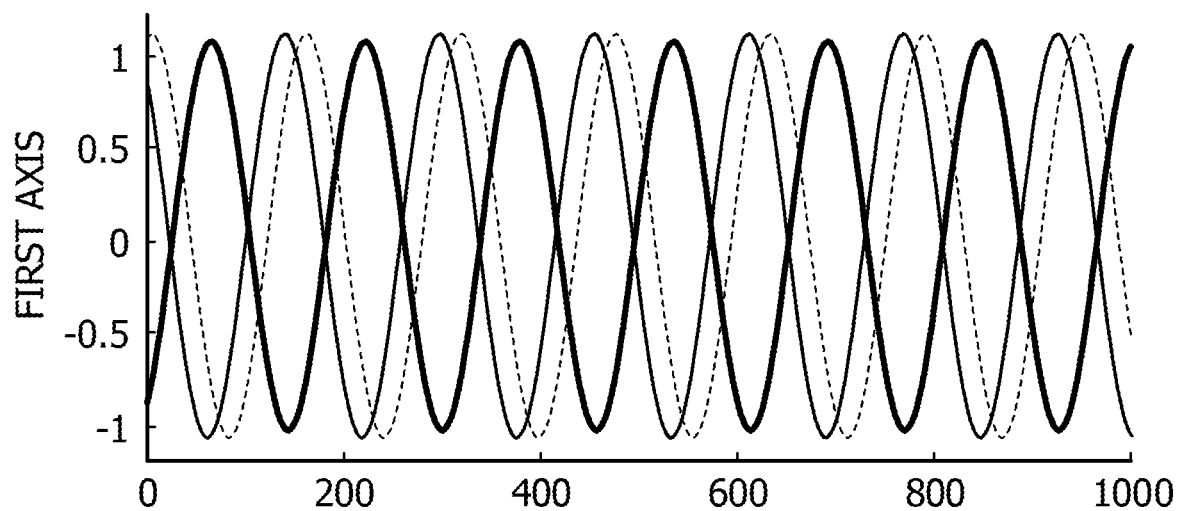
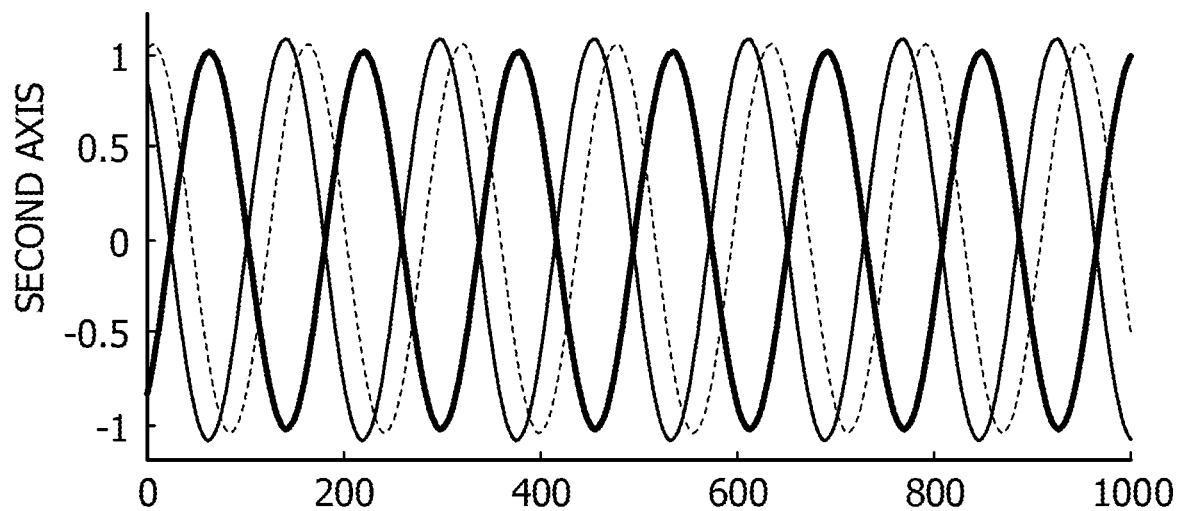

FIG. 28
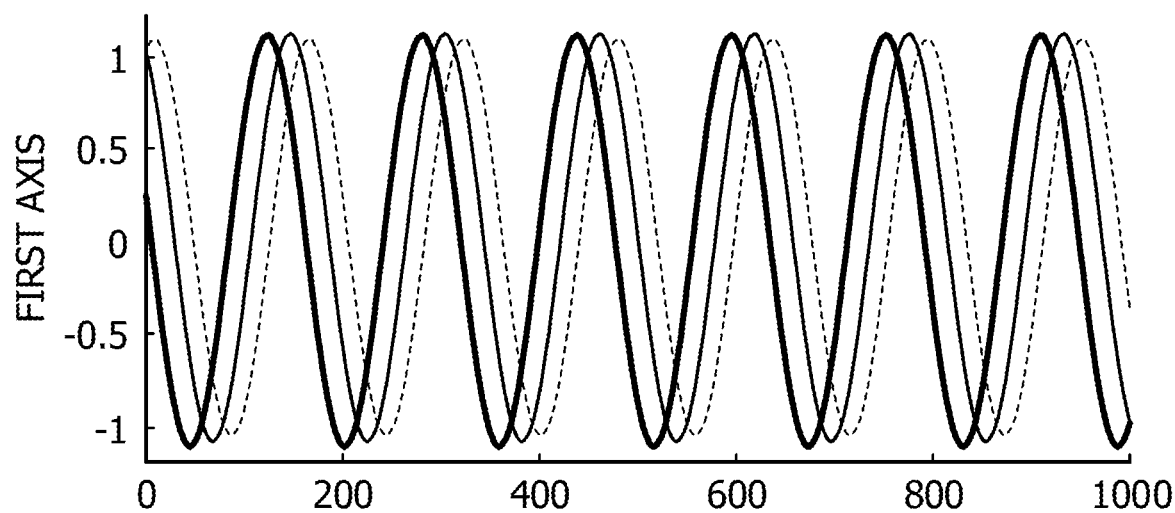
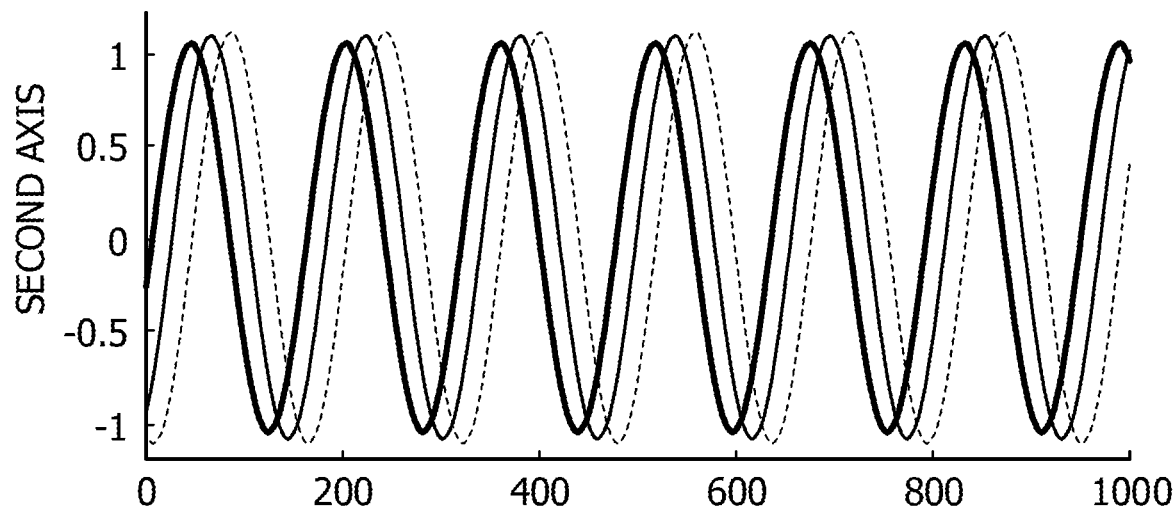

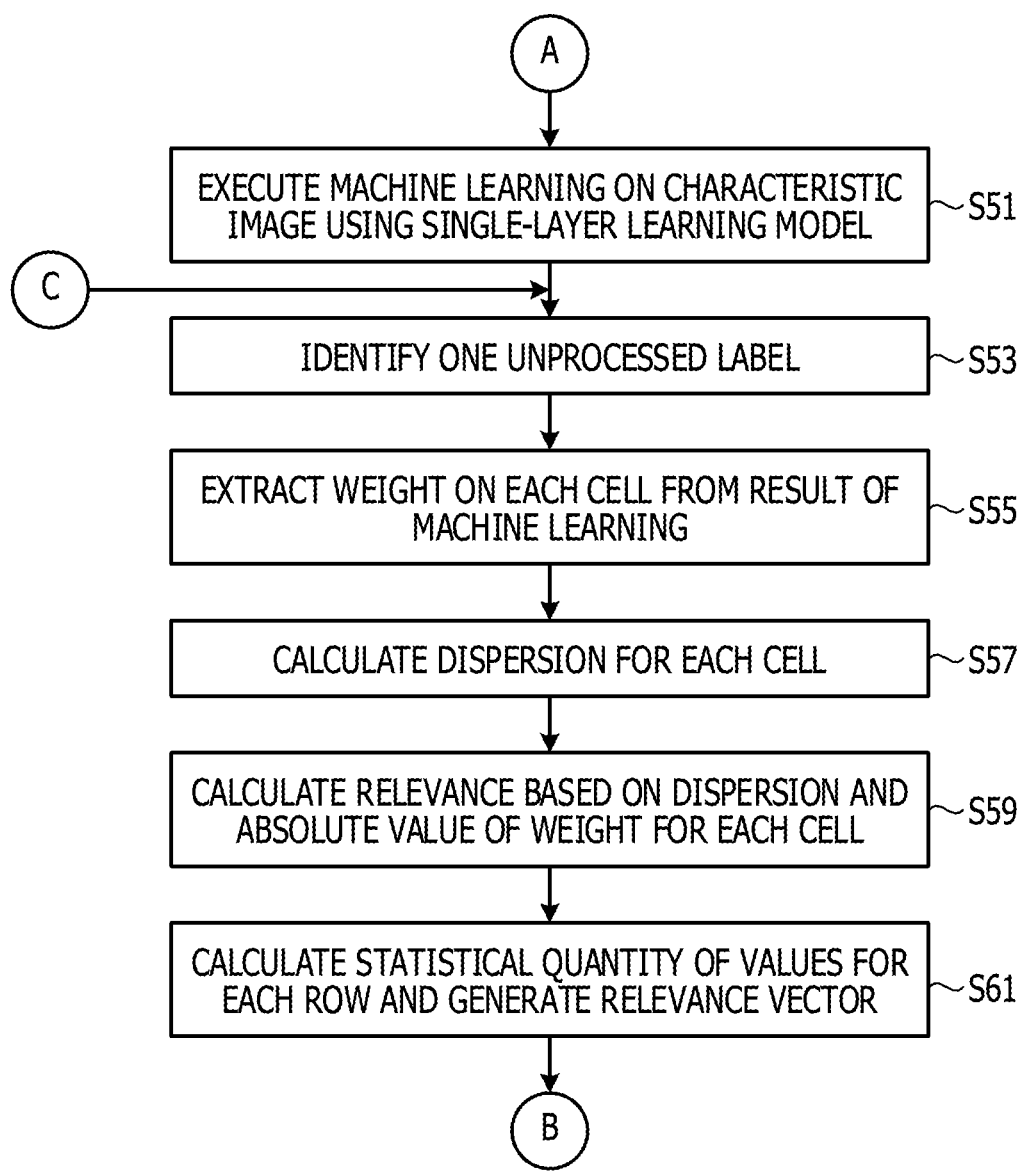

DATA GENERATION APPARATUS, DATA GENERATION METHOD, AND NON-TRANSITORY COMPUTER-READABLE STORAGE MEDIUM FOR STORING PROGRAM

CROSS-REFERENCE TO RELATED APPLICATION

This application is a continuation application of International Application PCT/JP2018/007041 filed on Feb. 26, 2018 and designated the U.S., the entire contents of which are incorporated herein by reference. The International Application PCT/JP2018/007041 is based upon and claims the benefit of priority of the prior Japanese Patent Application No. 2017-40325, filed on Mar. 3, 2017, the entire contents of which are incorporated herein by reference.

FIELD

The embodiments discussed herein are related to a technique of processing time series data, such as a data generation apparatus, data generation method, and a non-transitory computer-readable storage medium storing a program of data generation.

BACKGROUND

Machine learning on time series data has been in practice. For example, a computer is caused to execute machine learning for a learning model using time series data, acquired by a wearable sensor mounted on a person, as learning data and the state of the person at the time when the time series data was acquired, as training data. Then, the state of the person at the time when new time series data will be acquired is estimated by the computer utilizing the learning model subjected to the machine learning.

A technique as described below is disclosed regarding machine learning for time series data. Specifically, time series data is graphically represented based on a graphical representation technique and topological data analysis, which is a data analysis technique based on topology, is executed on the result of the graphical representation. Then, machine learning using a deep neural network (DNN) is executed on the result of the topological data analysis.

However, since the technique described in the above document is a machine learning technique for a single piece of time series data, this is not a technique suitable for machine learning on a plurality of pieces of time series data.

Examples of the related art include "Time-series Deep Learning: New AI Technology that Supports Safe Human Lives", Fujitsu Ltd., Mar. 10, 2016, [online], [retrieved on 2016 Dec. 1]. Retrieved from the Internet: <URL: http://journal.jp.fujitsu.com/2016/03/10/01/>.

SUMMARY

According to an aspect of the embodiments, a data generation method includes: executing a first generation process that includes generating a Betti number series corresponding to a contribution rate by performing persistent homology processing on a first point set, the first point set being generated by using a plurality of pieces of time series data and the contribution rate of each of the plurality of pieces of time series data, each of points included in the first point set being represented by coordinates; executing a second generation process that includes generating a characteristic image from a plurality of the Betti number series, the plurality of Betti number series being generated by performing the first generation process on each of the plurality of contribution rates; and executing a third generation process that includes generating machine learning data in which the characteristic image and a classification corresponding to the plurality of pieces of time series data are associated with each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram for explaining generation of an extended attractor;

FIG. 5 is a diagram illustrating an example of a value of α;

FIG. 8 is a diagram illustrating an example of bar code data;

FIG. 9 is a diagram for explaining a relationship between the bar code data and the Betti number series;

FIG. 21 is a diagram illustrating specific examples of time series data,

FIG. 22 is a diagram illustrating specific examples of time series data,

FIG. 23 is a diagram illustrating specific examples of time series data,

FIG. 24 is a diagram illustrating specific examples of time series data,

FIG. 25 is a diagram illustrating specific examples of time series data,

FIG. 26 is a diagram illustrating specific examples of time series data,

FIG. 27 is a diagram illustrating specific examples of time series data,

FIG. 28 is a diagram illustrating specific examples of time series data,

FIG. 30 is a flowchart illustrating a main processing flow of a second embodiment;

DESCRIPTION OF EMBODIMENTS

In an aspect, an object of the present disclosure is to generate characteristic information suitable for machine learning on a plurality of pieces of time series data.

First Embodiment

Figure 1:
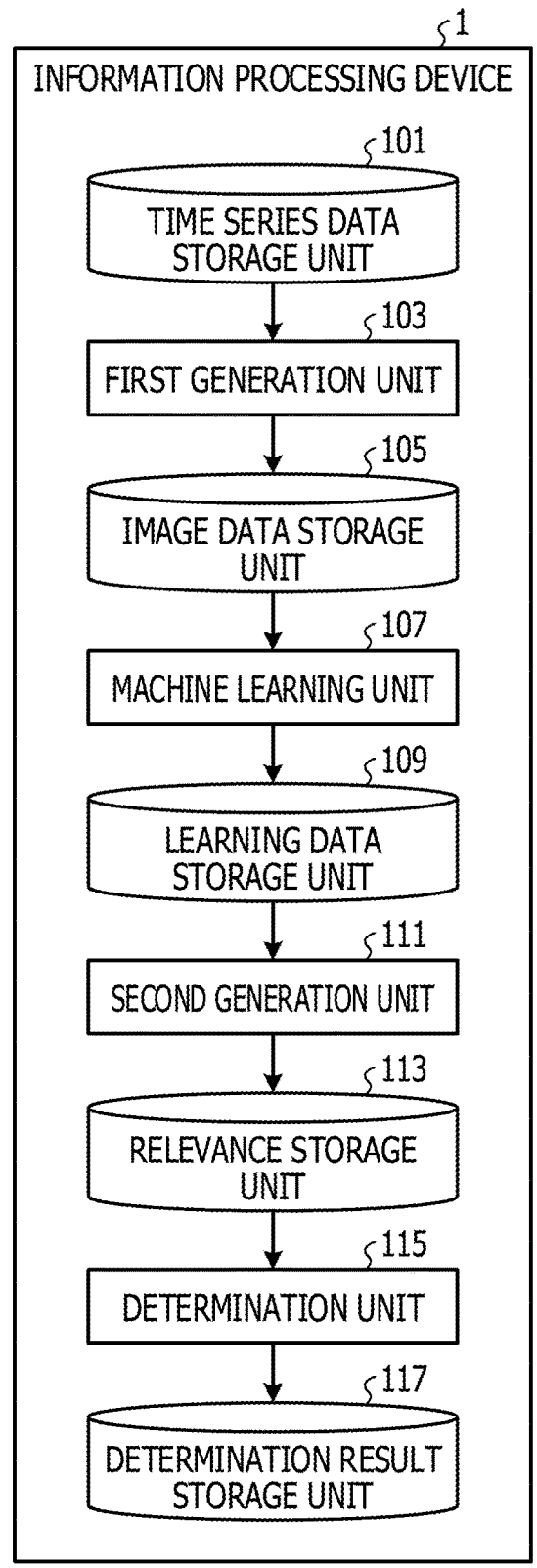
FIG. 1 is a functional block diagram of an information processing device according to a first embodiment.

FIG. 1 is a functional block diagram of an information processing device 1 according to a first embodiment. The information processing device 1 includes a time series data storage unit 101, a first generation unit 103, an image data storage unit 105, a machine learning unit 107, a learning data storage unit 109, a second generation unit 111, a relevance storage unit 113, a determination unit 115, and a determination result storage unit 117.

Figure 40:
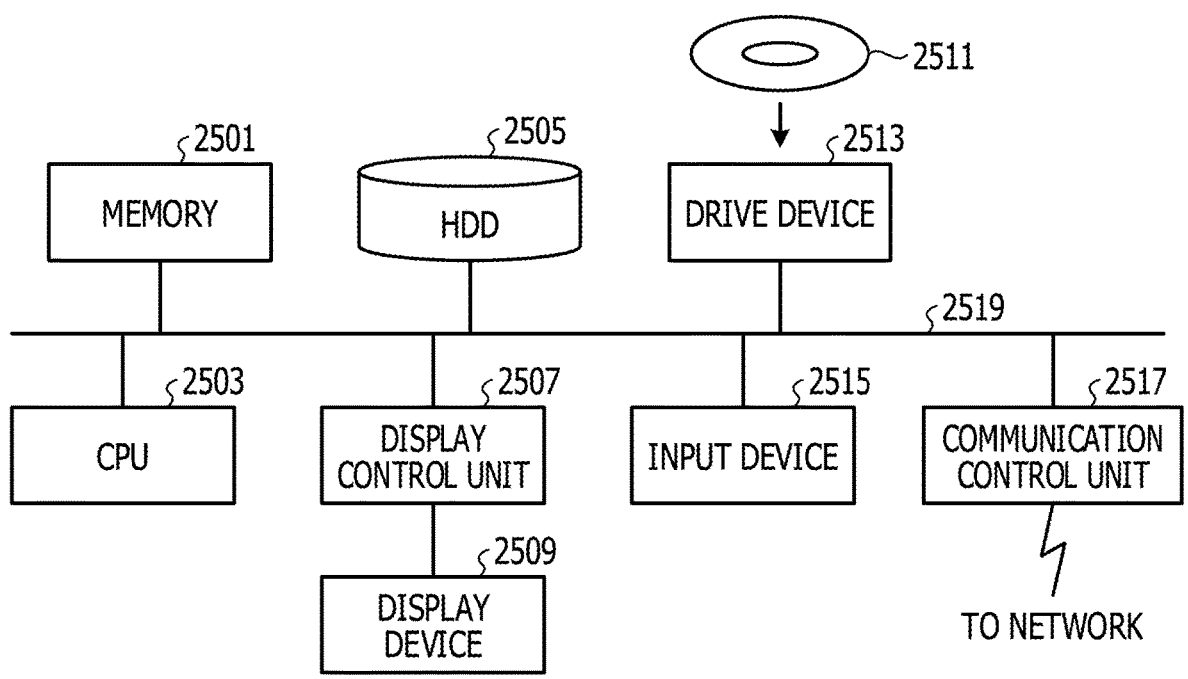
FIG. 40 is a functional block diagram of a computer.

The first generation unit 103, the machine learning unit 107, the second generation unit 111, and the determination unit 115 are realized, for example, by a central processing unit (CPU) 2503 illustrated in FIG. 40 executing a program loaded into a memory 2501 illustrated in FIG. 40. The time series data storage unit 101, the image data storage unit 105, the learning data storage unit 109, the relevance storage unit 113, and the determination result storage unit 117 are provided, for example, in a hard disk drive (HDD) 2505 or the memory 2501 illustrated in FIG. 40.

The first generation unit 103 executes processing based on data stored in the time series data storage unit 101, and then stores the processing result in the image data storage unit 105. The machine learning unit 107 executes processing based on data stored in the image data storage unit 105, and then stores the processing result in the learning data storage unit 109. The second generation unit 111 executes processing based on data stored in the learning data storage unit 109, and then stores the processing result in the relevance storage unit 113. The determination unit 115 executes processing based on data stored in the relevance storage unit 113, and then stores the processing result in the determination result storage unit 117.

Data stored in the time series data storage unit 101 is, for example, biological data (time series data of heart rate, pulse, body temperature, or the like), data of a wearable sensor (time series data of a gyroscope sensor, an acceleration sensor, a geomagnetic sensor, or the like), financial data (time series data of interest rates, prices, balance of payments, stock prices, or the like), natural environmental data (time series data of temperature, humidity, carbon dioxide concentration, or the like), social science data (data of labor statistics, demographic statistics, or the like), or the like. Note that the time series data is assumed to be data that changes in accordance with rules described below.

$$x(i)=f(x(i-1), \ldots, x(i-2), x(i-N)) \tag{1}$$

For example, irregular time series data or data on human movement such as a trace of handwritten characters are excluded from the targets of this embodiment. In addition, it is assumed that in the time series data storage unit 101, a plurality of data sets containing a plurality of pieces of time series data are stored.

Figure 2:
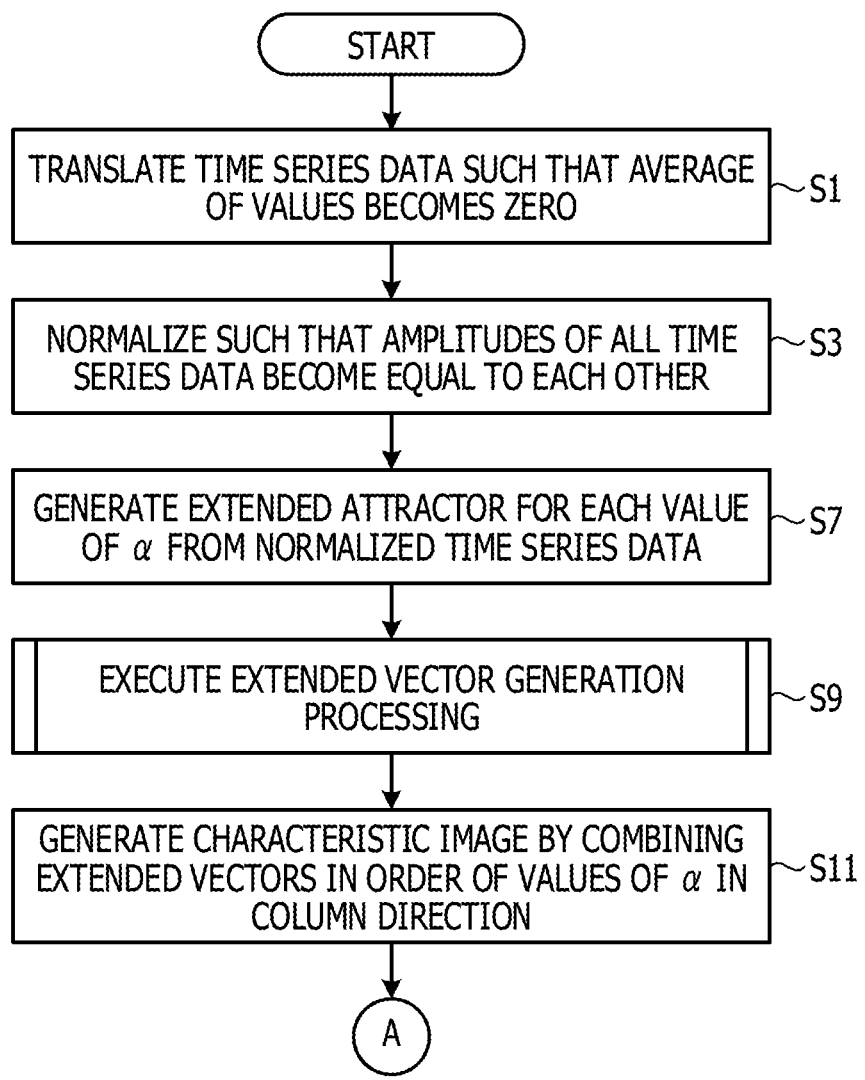
FIG. 2 is a flowchart illustrating a main processing flow of the first embodiment.

FIG. 2 is a flowchart illustrating a processing flow of processing executed by the information processing device 1 of a first embodiment.

The first generation unit 103 identifies one data set out of the plurality of data sets stored in the time series data storage unit 101. The first generation unit 103 then translates the plurality of pieces of time series data contained in the identified data set such that an average of the values of the plurality of pieces of time series data becomes zero (FIG. 2: Step S1).

The first generation unit 103 executes normalization such that the amplitudes of all the time series data on which the processing of Step S1 has been executed become equal to each other (Step S3).

Figure 3:
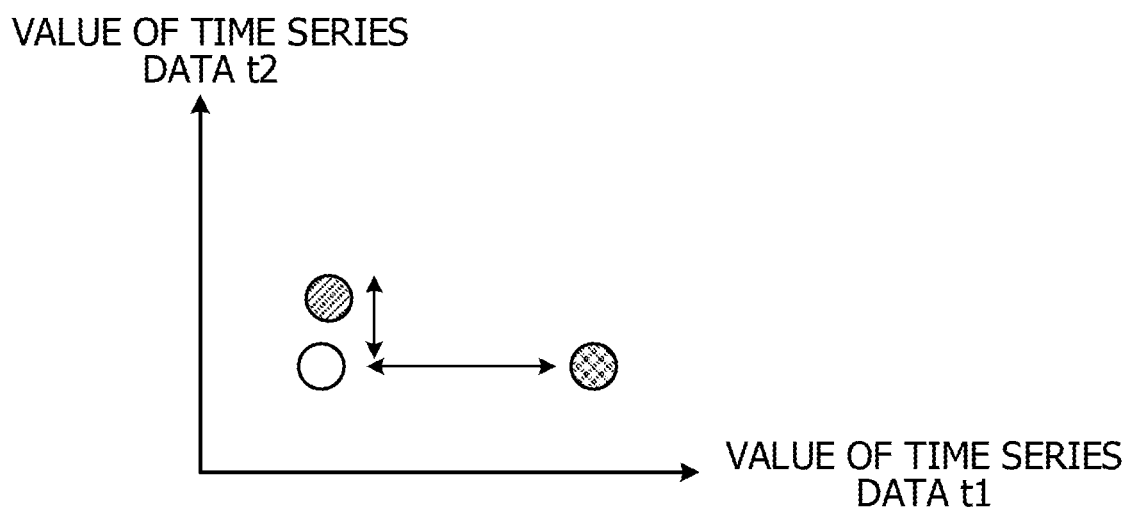
FIG. 3 is a diagram for explaining normalization of time series data.

In a case where the plurality of pieces of time series data are of different types, the axis scales are different, so that it is problematic to utilize the raw values of the time series data as they are. For example, as illustrated in FIG. 3, even when the variation of the value of the time series data t1 is larger than the variation of the value of the time series data t2, this does not necessarily mean that the time series data t1 also has a greater influence on the classification. Thus, there is a possibility that wrong learning be carried out such as learning with different axis scales. In view of this, this concern is solved by making the axis scales coincide with each other through the processing of Step S3.

The first generation unit 103 generates an extended attractor for each value of α from the plurality of pieces of normalized time series data (Step S7). The first generation unit 103 stores the generated extended attractor in the memory 2501.

For example, in a case where the number of pieces of time series data is 2, an extended attractor as follows is generated.

$$\begin{pmatrix} (1-\alpha)*x_1 \\ (1-\alpha)*x_2 \\ (1-\alpha)*x_3 \\ \alpha*y_1 \\ \alpha*y_2 \\ \alpha*y_3 \end{pmatrix}, \begin{pmatrix} (1-\alpha)*x_2 \\ (1-\alpha)*x_3 \\ (1-\alpha)*x_4 \\ \alpha*y_2 \\ \alpha*y_3 \\ \alpha*y_4 \end{pmatrix}, \ldots, \begin{pmatrix} (1-\alpha)*x_k \\ (1-\alpha)*x_{k+1} \\ (1-\alpha)*x_{k+2} \\ \alpha*y_k \\ \alpha*y_{k+1} \\ \alpha*y_{k+2} \end{pmatrix} \tag{2}$$

α is a contribution parameter. $x_i (1 \le i \le (k+2))$ is the value of first time series data and $y_j (1 \le j \le (k+2))$ is the value of second time series data.

FIG. 4 is a diagram for explaining the generation of the extended attractor. The generation of the extended attractor is based on the Takens' Embedding Theorem. N values (N is an embedding dimension. N=3 in the example of the formula (2)) taken out of the first time series data are multiplied by (1−α), N values taken out of the second time series data are multiplied by α, and these values become components of the coordinates of one point. In the example of the formula (2), since τ=1, every other element is taken out. Note that the values of N and τ are not limited to those of the example of the formula (2).

Figure 5:
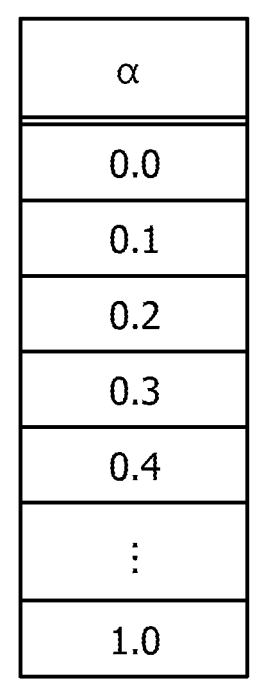

The contribution parameter α is, for example, a real number that satisfies 0≤α≤1, and is a parameter used to adjust the value of time series data. However, the range of α may not be such a range. In this embodiment, a plurality of values set at a regular interval are used, for example, as illustrated in FIG. 5.

Then, the first generation unit 103 performs extended vector generation processing using the extended attractor generated in Step S7 (Step S9). The extended vector generation processing is described with reference to FIGS. 6 to 10B.

Figure 6:
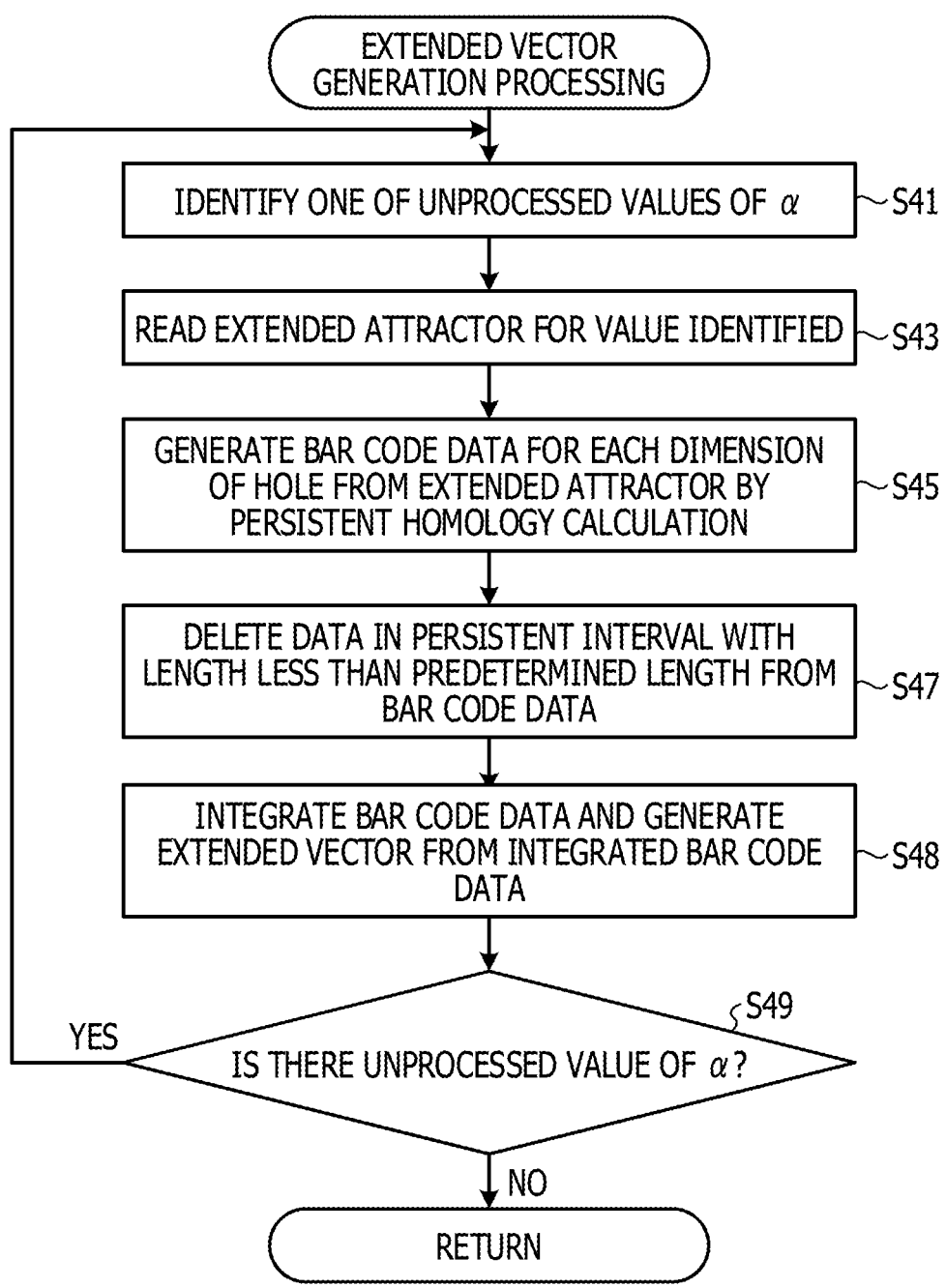
FIG. 6 is a flowchart illustrating a processing flow of extended vector generation processing.

The first generation unit 103 identifies one of unprocessed values of the contribution parameter α (FIG. 6: Step S41).

Then, the first generation unit 103 reads an extended attractor for the value identified in Step S41 from the memory 2501 (Step S43).

The first generation unit 103 generates bar code data for each dimension of a hole (hereinafter referred to as the hole dimension) from the extended attractor by persistent homology processing (Step S45).

"Homology" is a technique of expressing a target characteristic by the number of m (m≥0)-dimensional holes. The "hole" mentioned here is the source of a homology group. A zero-dimensional hole is a connected component, a one-dimensional hole is a hole (tunnel), and a two-dimensional hole is a hollow. The number of holes in each dimension is called a Betti number.

"Persistent homology" is a technique for characterizing a transition of m-dimensional holes in a target (here, an extended attractor). The persistent homology enables checking of characteristics regarding the location of points. In this technique, each of the points in the target is gradually spherically expanded, and the time of generation (represented by the radius of the sphere at the time of occurrence) of each hole during the process and the time of annihilation (represented by the radius of the sphere at the time of annihilation) thereof are identified.

Figure 7:
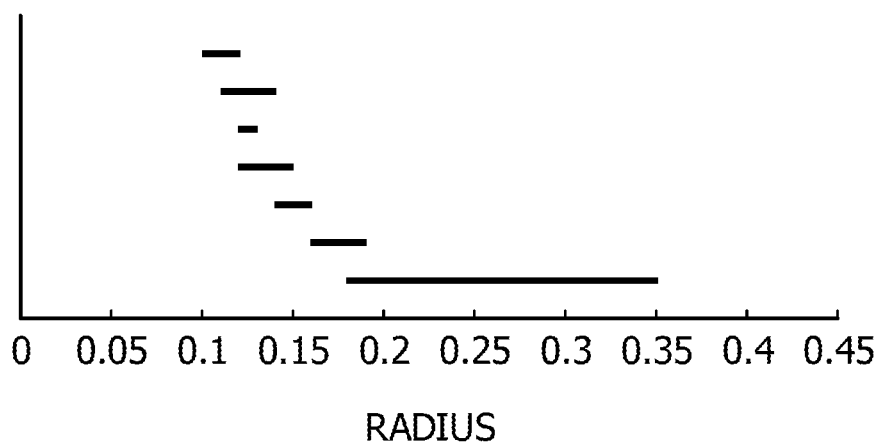
FIG. 7 is a diagram illustrating an example of bar code chart.

The use of the occurrence radius and the annihilation radius of the hole enables generation of a bar code chart, for example, as illustrated in FIG. 7. In FIG. 7, the horizontal axis represents the radius, and each line segment corresponds to one hole. The radius corresponding to the left end of the line segment is the occurrence radius of the hole, while the radius corresponding to the right end of the line segment is the annihilation radius of the hole. The line segment is called a persistent interval. It may be seen from such a bar code chart, for example, that there are two holes when the radius is 0.18.

FIG. 8 illustrates an example of data for generating a bar code chart (hereinafter referred to as the bar code data). In the example of FIG. 8, the bar code data includes a value representing the hole dimension, the occurrence radius of the hole, and the annihilation radius of the hole. In Step S45, the bar code data is generated for each hole dimension.

By executing the above processing, an analogous relationship between bar code data generated from a certain extended attractor and bar code data generated from another extended attractor is equivalent to an analogous relationship between the extended attractors. Therefore, the relationship between the extended attractor and the bar code data is a one-to-one relationship.

More specifically, the same extended attractor leads to the same bar code data to be generated. Conversely, the same bar code data leads to the same extended attractor. Since an analogous extended attractor also leads to analogous bar code data, requirements for machine learning are satisfied. On the other hand, a different extended attractor leads to different bar code data.

See, for example, "Protein Structure and Topology: Introduction to Persistent Homology" by Yasuaki Hiraoka, Kyoritsu Shuppan, for further details of persistent homology.

Referring back to FIG. 6, the first generation unit 103 deletes data in a persistent interval with a length less than a predetermined length from the bar code data generated in Step S45 (Step S47). Note that the length of the persistent interval is calculated by (annihilation radius-occurrence radius). The predetermined length is a length of time (hereinafter referred to as the block), for example, obtained by dividing the time between the occurrence of a zero-dimensional hole and the annihilation thereof by K. However, the predetermined length is not limited to the length of one block, but may be the length of more than one block.

Most of the source with the short time between the occurrence and the annihilation is caused by noise. The influence of noise may be reduced by deleting data in the persistent interval with the length less than the predetermined length. Thus, classification performance may be improved. However, the target to be deleted is data in a persistent interval of one or more dimensions.

When noise is generated, holes of one or more dimensions may be generated for a short amount of time. By executing the processing of Step S47, approximately the same data is generated in both cases. Thus, the influence of such noise may be reduced.

Note that, since the data in the persistent interval with the length less than the predetermined length is deleted, the analogous relationship between the bar code data after the deletion is not strictly equivalent to the analogous relationship between the original bar code data. The analogous relationship is equivalent if no data is deleted.

Referring back to FIG. 6, the first generation unit 103 integrates the bar code data to generate an extended vector from the integrated bar code data (Step S48). The extended vector is the Betti number series.

As described above, the bar code data is generated for each hole dimension. Thus, the first generation unit 103 generates a cluster of bar code data by integrating bar code data of more than one hole dimension. The Betti number series is data representing a relationship between the radius of the sphere (that is, time) and the Betti number in the persistent homology. With reference to FIG. 9, description is given of a relationship between bar code data and the Betti number series to be generated. The upper graph is generated from the bar code data, in which the horizontal axis represents the radius. The lower graph is generated from the Betti number series, in which the vertical axis represents the Betti number and the horizontal axis represents time. As described above, the Betti number represents the number of holes. For example, since the number of holes present is 10 at the time of the radius corresponding to the dashed line in the upper graph, the Betti number corresponding to the dashed line is also 10 in the lower graph. The Betti number is counted for each block. Since the lower graph is a graph of dummy time series data, the value itself in the horizontal axis does not have any meaning.

Basically, the same group is obtained by the same bar code data. That is, the same group is obtained if the original set of points is the same. However, there is a very rare case where the same group is obtained from different bar codes.

Figure 10A:
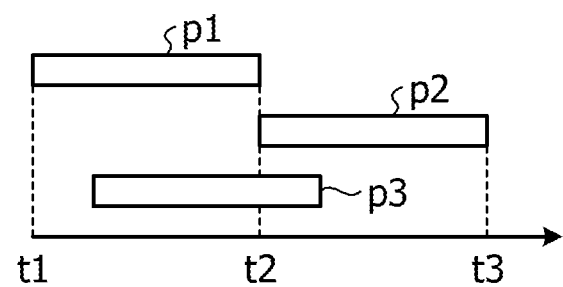
FIGS. 10A and 10B are diagrams illustrating examples of persistent intervals.
Figure 10B:
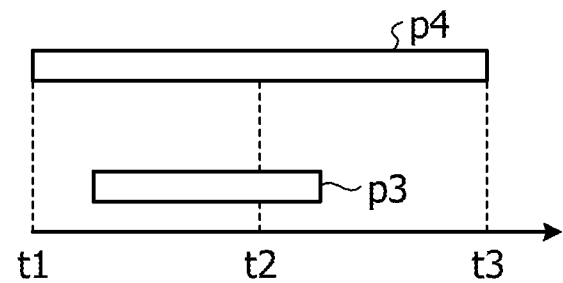

For example, bar code data as illustrated in FIGS. 10A and 10B is considered. This bar code data is data on holes of one or more dimensions. In the case of FIG. 10A, a persistent interval p1 starts at a time t1 and ends at a time t2, a persistent interval p2 starts at the time t2 and ends at a time t3. On the other hand, in the case of FIG. 10B, a persistent interval p4 starts at the time t1 and ends at the time t3. A persistent interval p3 is exactly the same in the both cases.

In such a case, exactly the same group is obtained from the bar code data in the both cases, and thus the both cases may not be differentiated from each other. However, such a phenomenon is very unlikely to occur. Moreover, the sets of points in the both cases are originally similar and have a very small impact on classification by machine learning. Therefore, the occurrence of such a phenomenon does not cause any problem.

Therefore, the analogous relationship between the Betti number series generated from certain bar code data and the Betti number series generated from another bar code data is equivalent to the analogous relationship between the bar code data unless such a rare case as described above occurs. For this reason, the analogous relationship between the Betti number series generated from the bar code data is approximately equivalent to the analogous relationship between the original extended attractors.

Referring back to FIG. 6, the first generation unit 103 determines whether or not there is any unprocessed value of $\alpha$ (Step S49). When there is any unprocessed value (Step S49: Yes route), the processing returns to Step S41. When there is no unprocessed value (Step S49: No route), the processing returns to the caller.

By executing the persistent homology processing as described above, the positional relationship between the extended attractors may be reflected on the bar code data. Since the number of bar codes is not fixed in the bar code data generated by the persistent homology processing, it is difficult to use the bar code data directly as inputs of machine learning. Therefore, in this embodiment, transforming the bar code data to the Betti number series enables the bar code data to be used as inputs of machine learning.

As described above, according to this embodiment, the influence of noise may be reduced.

Referring back to FIG. 2, the first generation unit 103 generates a characteristic image by combining the extended vectors generated in Step S9 in order of the value of $\alpha$ in a column direction (Step S11), and stores the generated characteristic image in the image data storage unit 105. The processing then proceeds to Step S13 in FIG. 12 via Terminal A.

Figure 11:
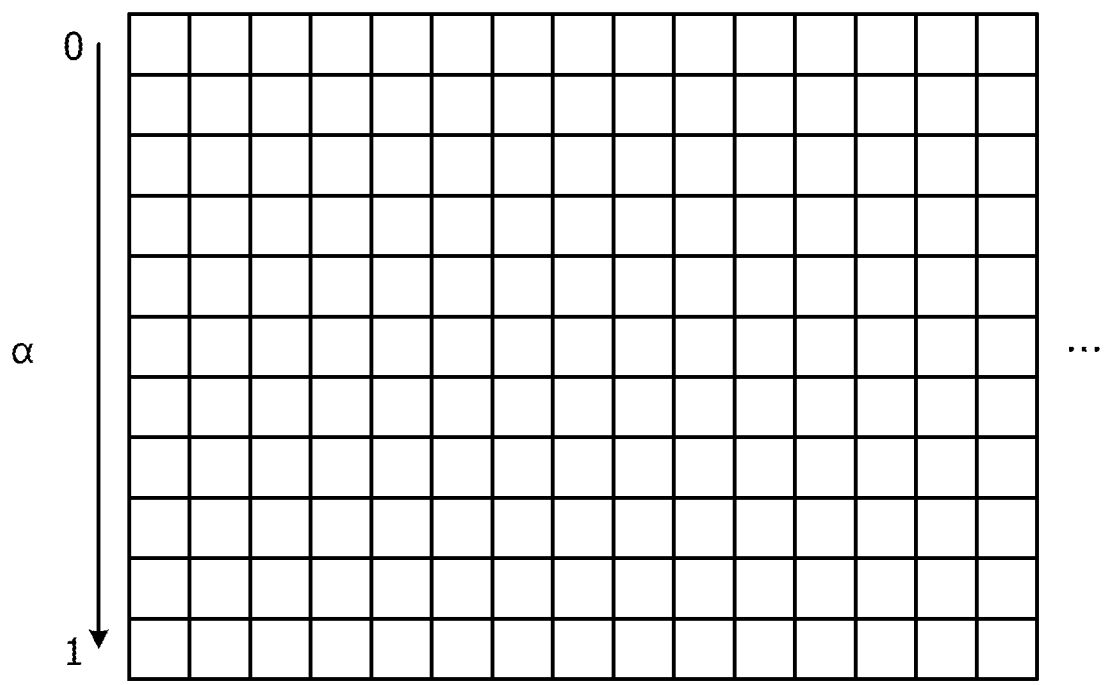
FIG. 11 is a diagram for explaining a characteristic image.

FIG. 11 is a diagram illustrating an example of a characteristic image. The squares represent cells, and the Betti number that is an element of the extended vector is stored in each of the cells. One row corresponds to one extended vector. Therefore, in the example of FIG. 11, eleven extended vectors are combined, and the characteristic image corresponds to a matrix with eleven rows. Although the number of elements in the extended vector is 15 in FIG. 11, the number of elements is not limited thereto.

Figure 12:
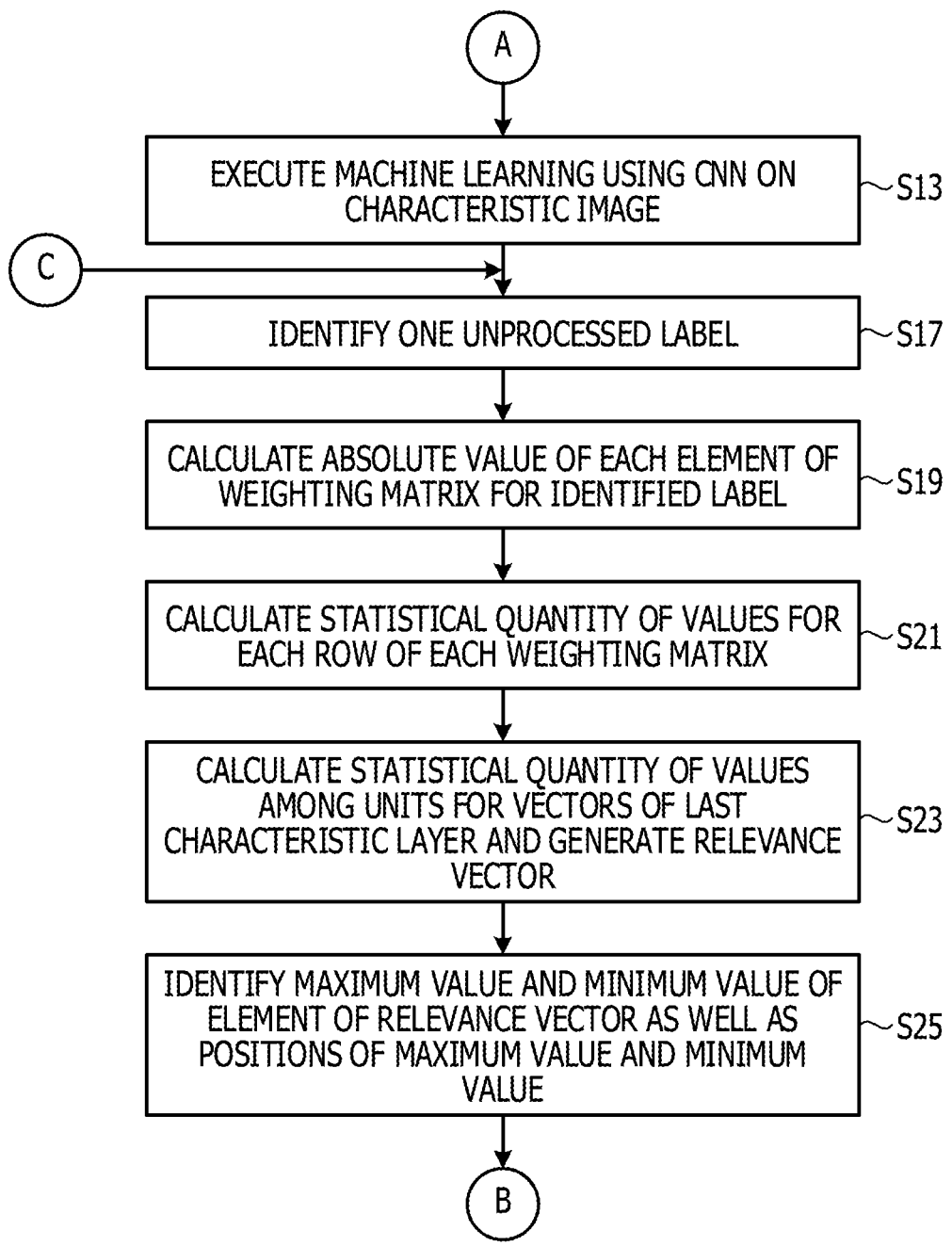
FIG. 12 is a flowchart illustrating a main processing flow of the first embodiment.

Transitioning to FIG. 12, the machine learning unit 107 executes machine learning using convolutional neural network (CNN) on the characteristic image generated in Step S11 (Step S13). The machine learning unit 107 executes machine learning based on the characteristic image and a label thereof. The machine learning unit 107 stores the result of the machine learning (for example, updated weighting matrix and the like) in the learning data storage unit 109.

Note that although an example in which the processing from Step S1 to S13 is executed on one data set out of a plurality of data sets has been illustrated for ease of explanation, the processing is actually executed on each of the plurality of data sets. Once it is confirmed that the machine learning is sufficiently conducted, the processing in and after Step S17 is executed.

The second generation unit 111 identifies one unprocessed label out of a plurality of labels regarding the classification (Step S17).

Figure 13:
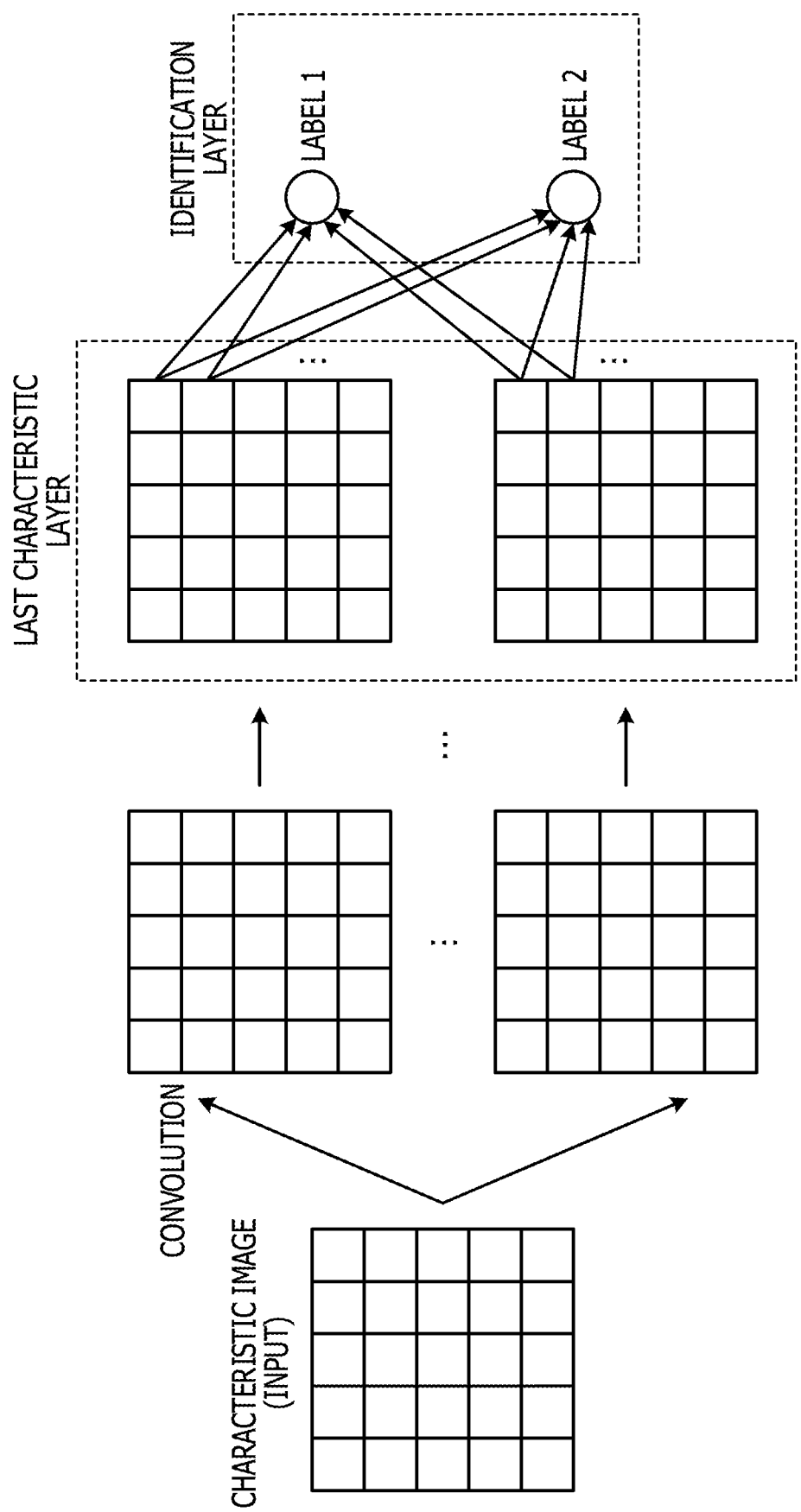
FIG. 13 is a schematic diagram illustrating an example of CNN in the first embodiment.

FIG. 13 is a schematic diagram illustrating an example of CNN in the first embodiment. In the machine learning of the first embodiment, operations such as convolution are executed using the characteristic image generated in Step S11 as an input. The last characteristic layer and the identification layer are fully connected. Although the number of labels is 2 in the example of FIG. 13, the number of labels may be 3 or more.

The second generation unit 111 reads an element of a weighting matrix between the last characteristic layer and the identification layer for the label identified in Step S17, from the learning data storage unit 109. The second generation unit 111 calculates the absolute value of the read element (Step S19).

Figure 14:
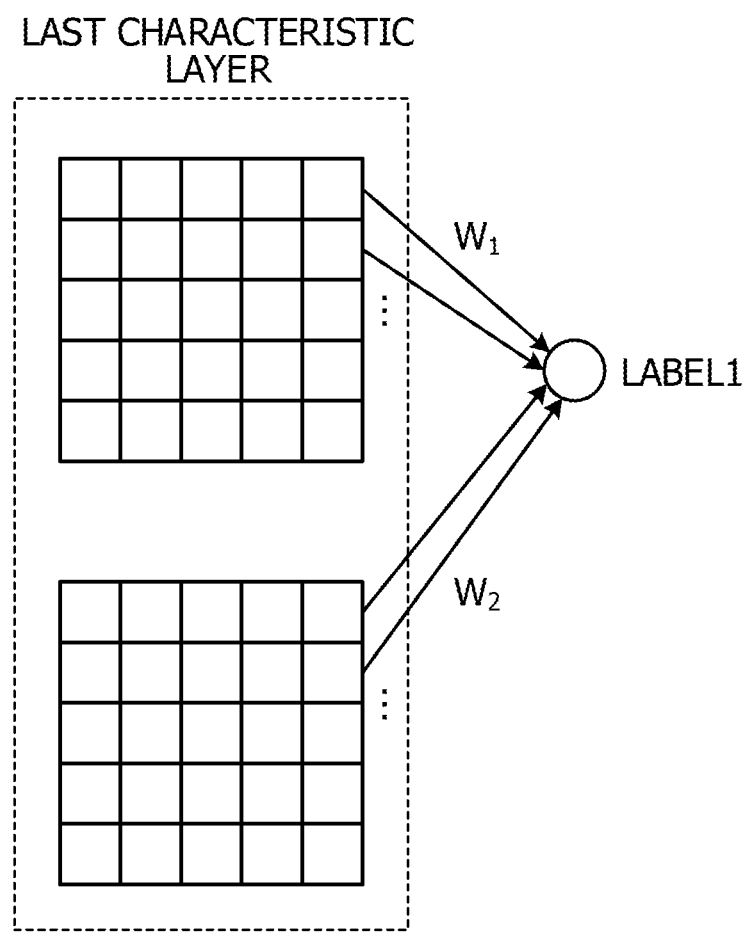
FIG. 14 is a diagram for explaining a relationship between a label and a weighting matrix.

FIG. 14 is a diagram for explaining a relationship between a label and a weighting matrix. Since the value of each cell of each unit in the last characteristic layer is multiplied by the weight in the weighting matrix $W_n$ in CNN, the weight for each cell is read in Step S19. Note that the absolute value of the weight is also referred to as activity.

The second generation unit 111 calculates a statistical quantity (for example, an average value or a maximum value) of the absolute value calculated in Step S19, for each row of each weighting matrix between the last characteristic layer and the identification layer (Step S21).

Figure 15:
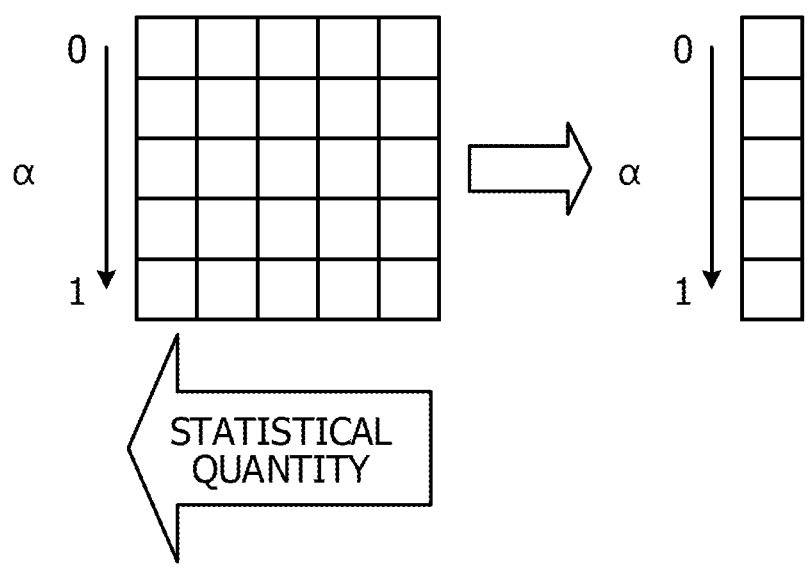
FIG. 15 is a diagram for explaining calculation of a statistical quantity.

FIG. 15 is a diagram for explaining calculation of a statistical quantity of an activity. Since image data of each unit of the last characteristic layer corresponds to image data obtained by compressing the characteristic image generated in Step S11, the vertical axis corresponds to the contribution parameter $\alpha$. As described later, in this embodiment, the correlation between the plurality of pieces of time series data is identified based on the relation between the contribution parameter $\alpha$ and the relevance. Hence, the statistical quantity is calculated for each value of $\alpha$, as illustrated in FIG. 15. Thus, for example, when the number of units of the last characteristic layer is 2, the statistical quantity of the absolute value calculated in Step S19 is calculated for each row of each of the two weighting matrices. In short, a vector is generated for each unit of the last characteristic layer.

The second generation unit 111 calculates a statistical quantity (for example, average, total sum, or maximum value) of the values of elements among units for vectors of the last characteristic layer. Then, the second generation unit 111 generates a vector having the calculated statistical quantity as an element (Step S23). In the first embodiment, the value of each element of the vector generated in Step S23 is handled as relevance. The relevance is a value expressing the degree of influence that a cell imposes on the target classification.

Figure 16:
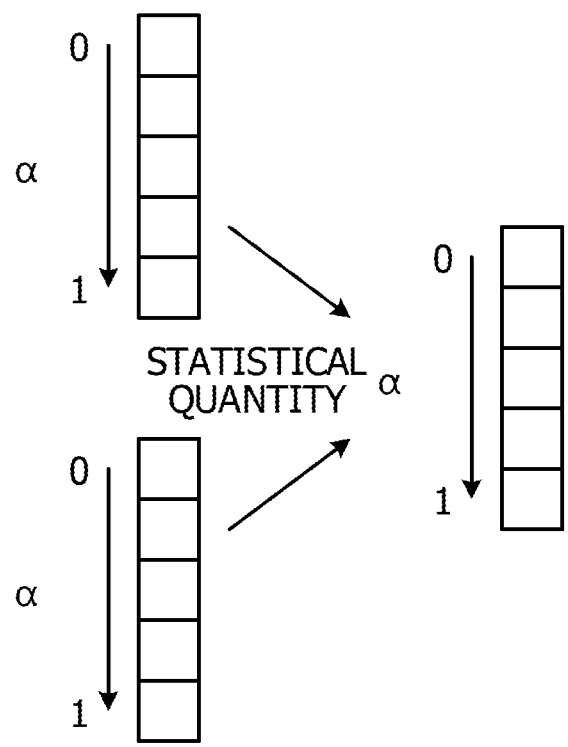
FIG. 16 is a diagram for explaining generation of a relevance vector.

FIG. 16 is a diagram for explaining the generation of a relevance vector. The number of elements of a vector generated as a result of the processing in Step S21 is the same between units. Hence, in Step S23, the statistical quantity of the values is calculated as the relevance for each row and one relevance vector is generated.

The second generation unit 111 identifies the maximum value, the minimum value, as well as the positions of the maximum value and the minimum value (for example, the element numbers), of the element of the relevance vector generated in Step S23 (Step S25). The second generation unit 111 stores the relevance vector and the maximum value, the minimum value, as well as the positions of the maximum value and the minimum value thus identified in the relevance storage unit 113. The processing then proceeds to Step S27 in FIG. 17 via Terminal B.

Figure 17:
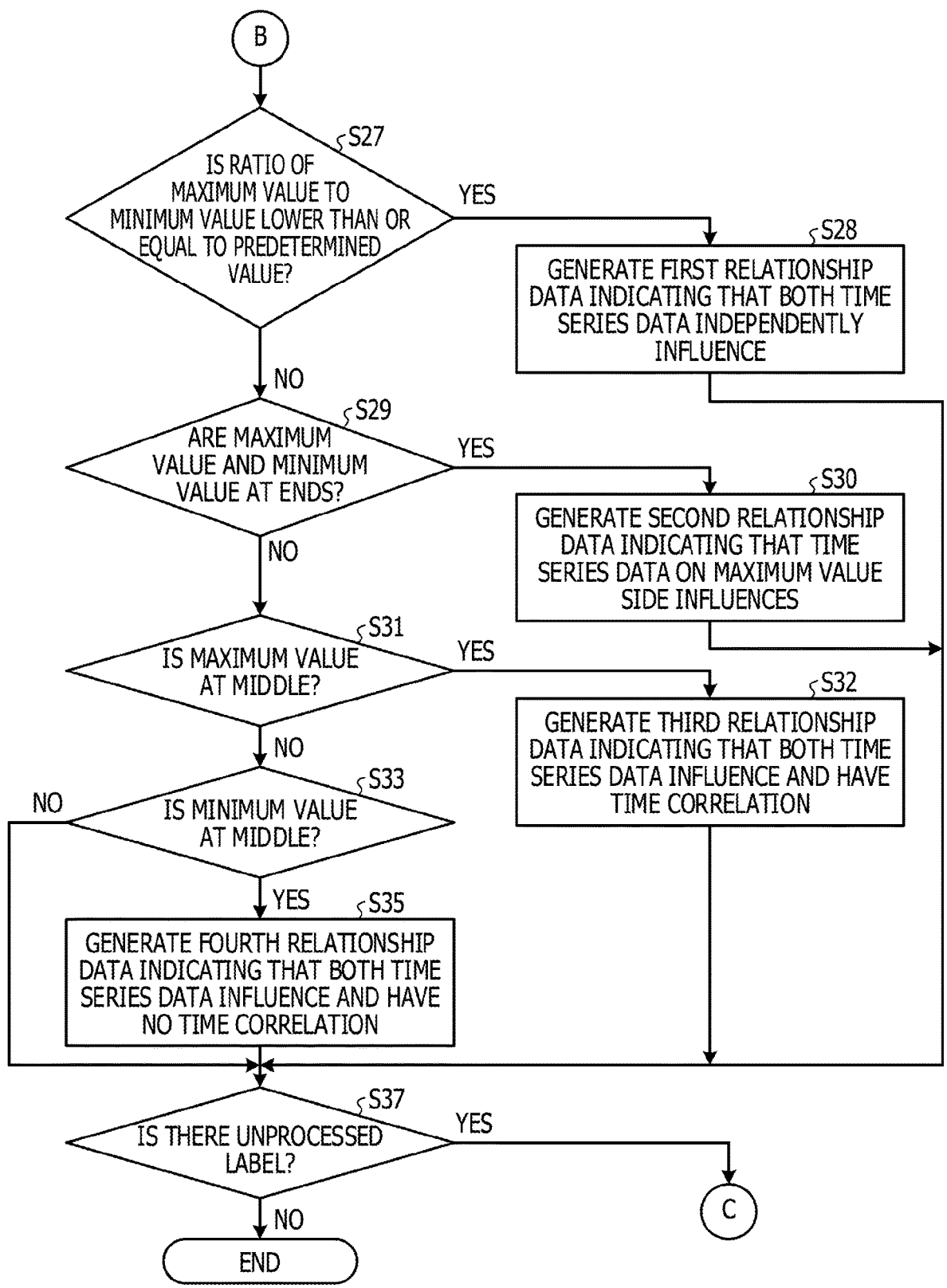
FIG. 17 is a flowchart illustrating a main processing flow of the first embodiment.

Transitioning to FIG. 17, the determination unit 115 reads information stored in the relevance storage unit 113. The determination unit 115 then determines whether the ratio of the maximum value to the minimum value is lower than or equal to a predetermined value (FIG. 17: Step S27). The predetermined value is, for example, 1.2. When the ratio of the maximum value to the minimum value is lower than or equal to the predetermined value, this means that the difference between maximum value and the minimum value is relatively small.

When the ratio of the maximum value to the minimum value is lower than or equal to the predetermined value (Step S27: Yes route), the determination unit 115 executes the processing described below. Specifically, the determination unit 115 generates first relationship data that indicates that both pieces of time series data each independently influence the classification for the label identified in Step S17 (Step S28), and stores the first relationship data in the determination result storage unit 117. Then, the processing proceeds to Step S37.

Figure 18:
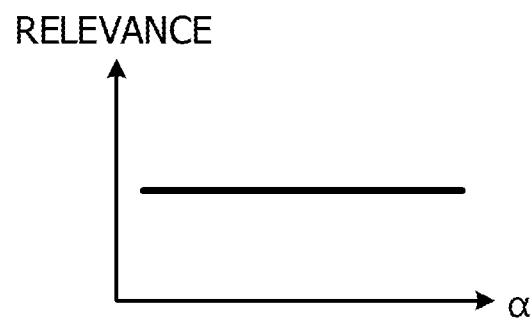
FIG. 18 is a graph illustrating a pattern on first relationship data.

FIG. 18 is a graph illustrating a pattern on the first relationship data. In FIG. 18, the vertical axis represents relevance and the horizontal axis represents contribution parameter $\alpha$. When the ratio of the maximum value to the minimum value is lower than or equal to the predetermined value, the relevance becomes similar between the case where the value of $\alpha$ is relatively small (that is, the case where the value of the contribution parameter by which one of the time series data is multiplied is relatively large) and the case where the value of $\alpha$ is relatively large (that is, the case where the value of the contribution parameter by which the other time series data is multiplied is relatively large). In such a case, it is considered that both pieces of time series data are influencing the classification for the target label. Since relevance when the value of $\alpha$ is around the middle (when $\alpha$ is about 0.5 when the range of $\alpha$ is supposed to be $0 \leq \alpha \leq 1$) is also similar to the relevance of both ends, it is considered that no time correlation between the time series data.

On the other hand, when the ratio of the maximum value to the minimum value is not lower than or equal to the predetermined value (Step S27: No route), the determination unit 115 executes the processing described below. Specifically, the determination unit 115 determines whether the maximum value and the minimum value are at ends of the relevance vector (Step S29).

When the maximum value and the minimum value are at ends of the relevance vector (Step S29: Yes route), the determination unit 115 executes the processing described below. Specifically, the determination unit 115 generates second relationship data that indicates that time series data on the maximum value side influences the classification for the label identified in Step S17 (Step S30), and stores the second relationship data in the determination result storage unit 117. Then, the processing proceeds to Step S37.

Figure 19A:
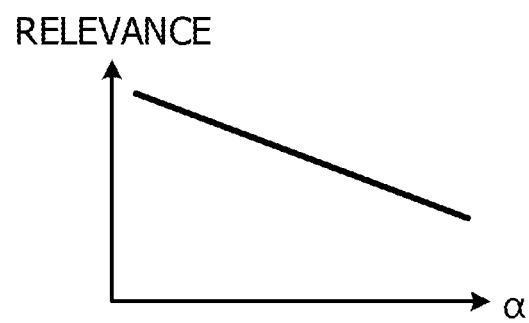
FIGS. 19A and 19B are graphs illustrating patterns on second relationship data.
Figure 19B:
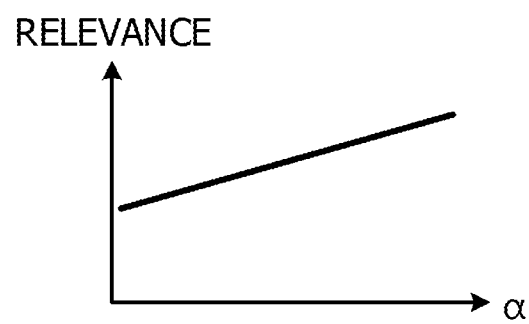

FIGS. 19A and 19B are graphs illustrating patterns on the second relationship data. In FIGS. 19A and 19B, the vertical axis represents relevance and the horizontal axis represents contribution parameter $\alpha$. When the maximum value and the minimum value are at ends of the relevance vector, the relationship between the relevance and the contribution parameter $\alpha$ is approximately as illustrated in FIG. 19A or 19B. In such a case, it is considered that the time series data on the maximum value side of the relevance influences the classification for the target label. Then, it is considered that there is no time correlation between time series data.

On the other hand, when at least one of the maximum value and the minimum value is not at an end of the relevance vector (Step S29: No route), the determination unit 115 executes the processing described below. Specifically, the determination unit 115 determines whether the maximum value is at a middle of the relevance vector (Step S31).

When the maximum value is at the middle of the relevance vector (Step S31: Yes route), the determination unit 115 executes the processing described below. Specifically, the determination unit 115 generates third relationship data that indicates that both pieces of time series data influence the classification for the label identified in Step S17 and that there is correlation between the time series data (Step S32), and stores the third relationship data in the determination result storage unit 117. Then, the processing proceeds to Step S37.

Figure 20A:
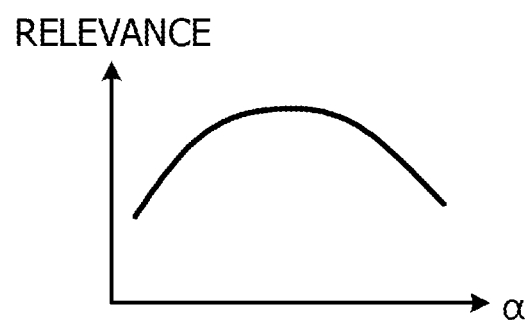
FIGS. 20A and 20B are graphs illustrating a pattern on third relationship data and a pattern on fourth relationship data.

FIG. 20A is a graph illustrating a pattern on the third relationship data. In FIG. 20A, the vertical axis represents relevance and the horizontal axis represents contribution parameter $\alpha$. It is considered that in a case where the maximum value is at a middle of the relevance vector, the values of the relevance at both ends are relatively small. In this case, sole time series data does not influence the classification for the target label. Then, since the maximum value is at the middle of the relevance vector, it is considered that there is time correlation between the time series data.

On the other hand, when the maximum value is not at the middle of the relevance vector (Step S31: No route), the determination unit 115 executes the processing described below. Specifically, the determination unit 115 determines whether the minimum value is at the middle of the relevance vector (Step S33).

When the minimum value is at the middle of the relevance vector (Step S33: Yes route), the determination unit 115 executes the processing described below. Specifically, the determination unit 115 generates fourth relationship data that indicates that both pieces of time series data influence the classification for the label identified in Step S17 and that there is no correlation between the time series data (Step S35), and stores the fourth relationship data in the determination result storage unit 117. On the other hand, when the minimum value is not at the middle of the relevance vector (Step S33: No route), the processing proceeds to Step S37.

Figure 20B:
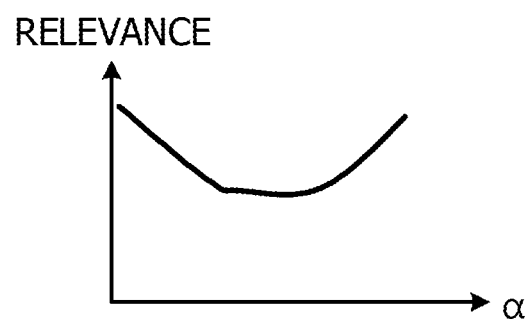

FIG. 20B is a graph illustrating a pattern on the fourth relationship data. In FIG. 20B, the vertical axis represents relevance and the horizontal axis represents contribution parameter $\alpha$. It is considered that in a case where the minimum value is at a middle of the relevance vector, the values of the relevance at both ends are relatively large. In this case, sole time series data influences the classification for the target label. Then, since the minimum value is at the middle of the relevance vector, it is considered that there is no time correlation between the time series data.

The second generation unit 111 determines whether there is any unprocessed label (Step S37). When there is any unprocessed label (Step S37: Yes route), the processing returns to Step S17 in FIG. 12 via Terminal C. On the other hand, when there is no unprocessed label (Step S37: No route), the processing is terminated. Note that relationship data stored in the determination result storage unit 117 is displayed on a display device or transmitted to another terminal to be checked by a user.

As described above, according to this embodiment, a characteristic image reflecting the respective characteristics of a plurality of pieces of time series data is generated. Although it is difficult to use a plurality of pieces of time series data as input of machine learning as they are, a characteristic image generated by the method of this embodiment is suitable for machine learning. In addition, since noise is removed during the process of generating a characteristic image, it is possible to enhance the machine learning accuracy.

Hereinafter, the identification of correlation between time series data is additionally described using specific examples illustrated in FIGS. 21 to 29A to 29D.

The upper stages in FIGS. 21 to 28 illustrate first time series data (time series data of a "first axis" in FIGS. 21 to 28) while the lower stages in FIGS. 21 to 28 illustrate second time series data (time series data of a "second axis" in FIGS. 21 to 28. Time series data with the same line type are contained in the same data set. For example, time series data of the thick line of the first axis in FIG. 21 is contained in the same data set as that of time series data of the thick line of the second axis in FIG. 21.

Figure 29A:
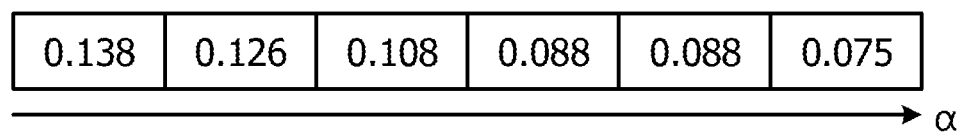
FIGS. 29A to 29D are diagrams illustrating relationships between relevance and a contribution parameter.

First, a first example is described using FIGS. 21, 22, and 29A. In the first example, when the combination of the time series data of the first axis and the time series data of the second axis is the combination illustrated in FIG. 21, a label 1 is applied while the combination of the time series data of the first axis and the time series data of the second axis is the combination illustrated in FIG. 22, a label 2 is applied.

To be more specific, as illustrated in FIG. 21, the amplitude of all the time series data of the first axis is about 1 while the amplitude of the time series data of the second axis is given at random. The phase of the time series data of the first axis and the phase of the time series data of the second axis are given at random.

In addition, as illustrated in FIG. 22, the amplitude of all the time series data of the first axis is about 0.5 while the amplitude of the time series data of the second axis is given at random. The phase of the time series data of the first axis and the phase of the time series data of the second axis are given at random.

A relevance vector calculated by executing the processing of this embodiment on the plurality of data sets illustrated in FIGS. 21 and 22 is illustrated in FIG. 29A. In the example illustrated in FIG. 29A, the ratio of the maximum value (0.138) to the minimum value (0.075) is larger than the predetermined value (here, 1.2). The maximum value of the relevance appears when the value of $\alpha$ is smallest while the minimum value of the relevance appears when the value of $\alpha$ is largest. Since this pattern corresponds to the pattern illustrated in FIG. 19A, it is understood that only the time series data of the first axis, which is time series data on the maximum value side, influences the classification (that is, the time series data of the second axis is irrelevant to the classification).

Figure 29B:
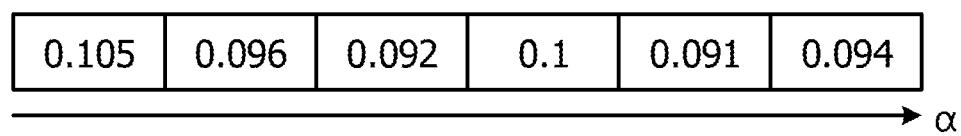

Then, a second example is described using FIGS. 23, 24, and 29B. In the second example, when the combination of the time series data of the first axis and the time series data of the second axis is the combination illustrated in FIG. 23, a label 1 is applied while the combination of the time series data of the first axis and the time series data of the second axis is the combination illustrated in FIG. 24, a label 2 is applied.

To be more specific, as illustrated in FIG. 23, the amplitude of the time series data of the first axis is about 1 while the amplitude of the time series data of the second axis is about 0.5, for each data set. The phase of the time series data of the first axis and the phase of the time series data of the second axis are given at random.

In addition, as illustrated in FIG. 24, the amplitude of the time series data of the first axis is about 0.5 while the amplitude of the time series data of the second axis is about 1, for each data set. The phase of the time series data of the first axis and the phase of the time series data of the second axis are given at random.

A relevance vector calculated by executing the processing of this embodiment on the plurality of data sets illustrated in FIGS. 23 and 24 is illustrated in FIG. 29B. In the example illustrated in FIG. 29B, the maximum value of the relevance is 0.105 while the minimum value of the relevance is 0.091. Since the ratio of the maximum value to the minimum value is less than or equal to the predetermined value (here, 1.2), this pattern corresponds to the pattern illustrated in FIG. 18. In other words, it is understood that both pieces of time series data of the first axis and the time series data of the second axis influence the classification. In this case, it is possible to achieve classification using at least one of the time series data.

Figure 29C:
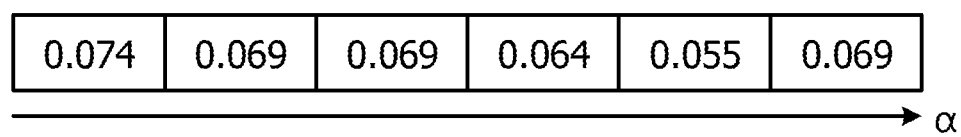

A third example is described using FIGS. 25, 26, and 29C. In the third example, when the combination of the time series data of the first axis and the time series data of the second axis is the combination illustrated in FIG. 25, a label 1 is applied while the combination of the time series data of the first axis and the time series data of the second axis is the combination illustrated in FIG. 26, a label 2 is applied.

To be more specific, as illustrated in FIG. 25, both of the amplitude of the time series data of the first axis and the amplitude of the time series data of the second axis are about 1, or both of the amplitude of the time series data of the first axis and the amplitude of the time series data of the second axis are about 0.5, for each data set. The phase of the time series data of the first axis and the phase of the time series data of the second axis are given at random.

In addition, as illustrated in FIG. 26, the amplitude of the time series data of the first axis is about 1 and the amplitude of the time series data of the second axis is about 0.5, or the amplitude of the time series data of the first axis is about 0.5 and the amplitude of the time series data of the second axis is about 1, for each data set. The phase of the time series data of the first axis and the phase of the time series data of the second axis are given at random.

A relevance vector calculated by executing the processing of this embodiment on the plurality of data sets illustrated in FIGS. 25 and 26 is illustrated in FIG. 29C. In the example illustrated in FIG. 29C, the maximum value of the relevance is 0.074 while the minimum value of the relevance is 0.055. Since the ratio of the maximum value to the minimum value is larger than the predetermined value (here, 1.2) and the minimum value is in a cell close to the cell at the middle, this pattern possibly corresponds to the pattern illustrated in FIG. 20B. In other words, it is considered that both pieces of time series data of the first axis and the time series data of the second axis influence the classification (that is, both time series data are used) but both have no time correlation.

Figure 29D:
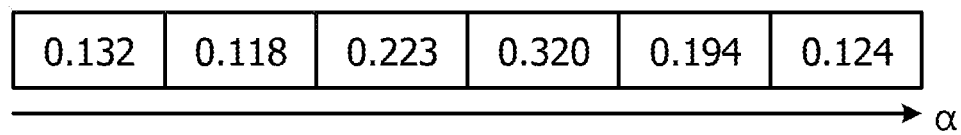

A fourth example is described using FIGS. 27, 28, and 29D. In the fourth example, when the combination of the time series data of the first axis and the time series data of the second axis is the combination illustrated in FIG. 27, a label 1 is applied while the combination of the time series data of the first axis and the time series data of the second axis is the combination illustrated in FIG. 28, a label 2 is applied.

To be more specific, as illustrated in FIG. 27, both of the amplitude of the time series data of the first axis and the amplitude of the time series data of the second axis are about 1, and the phase of the time series data of the first axis and the phase of the time series data of the second axis are the same, for each data set.

In addition, as illustrated in FIG. 28, both of the amplitude of the time series data of the first axis and the amplitude of the time series data of the second axis are about 1, and the phase of the time series data of the second axis is shifted by a half phase from the phase of the time series data of the first axis, for each data set.

A relevance vector calculated by executing the processing of this embodiment on the plurality of data sets illustrated in FIGS. 27 and 28 is illustrated in FIG. 29D. In the example illustrated in FIG. 29D, the maximum value of the relevance is 0.320 while the minimum value of the relevance is 0.118. Since the ratio of the maximum value to the minimum value is larger than the predetermined value (here, 1.2) and the maximum value is in the cell at the middle, this pattern corresponds to the pattern illustrated in FIG. 20A. In other words, it is considered that both pieces of time series data of the first axis and the time series data of the second axis influence the classification (that is, both time series data are used) and both have time correlation.

As described above, according to this embodiment, it is possible to identify correlation between a plurality of pieces of time series data for a target label. For example, in a case where it is revealed that only one of two pieces of time series data influences classification, it is possible to remove the other time series data from the target for acquiring and analyzing a value, thus making it possible to avoid adverse influence on classification and to shorten time and cost to be taken for acquiring and analyzing data. For example, in a case where it is possible to perform classification with only one of two pieces of time series data, since it is possible to select time series data from the viewpoint of easiness in acquiring data and the like, it is possible to reduce time and cost to be taken for acquiring data. Moreover, it also becomes possible to reduce time and cost to be taken for analysis. For example, in a case where it is found that both of two pieces of time series data are desired, it is possible to confirm whether to acquire two pieces of time series data with time axes aligned with each other in advance, so that sensors and the like are not erroneously set.

Furthermore, in the first embodiment, since machine learning using CNN is utilized with relationships between cells in a characteristic image taken into consideration, it is possible to enhance the learning accuracy as compared to other embodiments to be described below.

Second Embodiment

Although the machine learning using CNN is executed on a characteristic image in the first embodiment, the method for machine learning is not limited to CNN. Hereinafter, a method including directly learning a characteristic image is described using FIGS. 30 and 31. Note that since a part in the second embodiment that is different from the processing of the first embodiment is the processing after Terminal A, only the processing after Terminal A is described below. The machine learning in the second embodiment is referred to as machine learning using a single-layer learning model.

First, the machine learning unit 107 executes machine learning using a single-layer learning model on a characteristic image generated in Step S11 (FIG. 30: Step S51). The machine learning unit 107 stores the result of the machine learning (for example, updated weighting matrix and the like) in the learning data storage unit 109.

Figure 31:
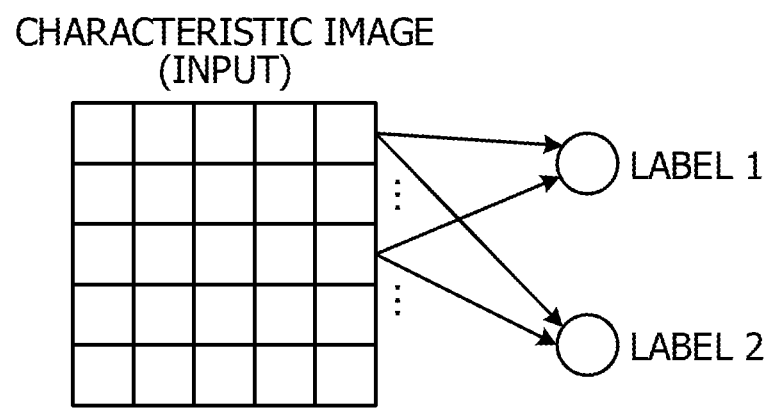
FIG. 31 is a diagram illustrating an example of a learning model in the second embodiment.

FIG. 31 is a diagram illustrating an example of a learning model in the second embodiment. In the second embodiment, machine learning is executed on a value itself of each cell in a characteristic image. A weight toward an identification layer is imposed on the value of each cell.

The processing after Step S53 is executed after it is confirmed that the processing in Step S51 has been executed on each of a plurality of data sets and machine learning has been sufficiently conducted.

The second generation unit 111 identifies one unprocessed label out of a plurality of labels regarding the classification (Step S53).

The second generation unit 111 extracts a weight on each cell in a characteristic image from the learning data storage unit 109, for the label identified in Step S53 (Step S55).

The second generation unit 111 calculates dispersion for each cell in the characteristic image (Step S57). Since executing the processing up to Step S11 on each of the plurality of data sets allows a plurality of characteristic images to be generated, dispersion is calculated from a plurality of values for each cell.

The second generation unit 111 calculates relevance based on the calculated dispersion and the absolute value of the extracted weight for each cell in the characteristic image (Step S59). For example, when the dispersion of a cell (x, y) is represented by $v_{x,y}$ and the absolute value of the weight is represented by $w_{x,y}$, the second generation unit 111 calculates the relevance of the cell (x, y) as $v_{x,y} * w_{x,y}$.

The second generation unit 111 calculates a statistical quantity (for example, the average or the maximum value) of relevance for each row to generate a relevance vector (Step S61), and stores the generated vector in the relevance storage unit 113. Then, the processing then proceeds to Step S27 in FIG. 17 via Terminal B.

Executing the above-described processing makes it possible to identify correlation between a plurality of pieces of time series data even when it is not appropriate to execute CNN, for example.

Third Embodiment

In the third embodiment, machine learning using support vector machine (SVM) is executed on data generated from an extended vector.

Figure 32:
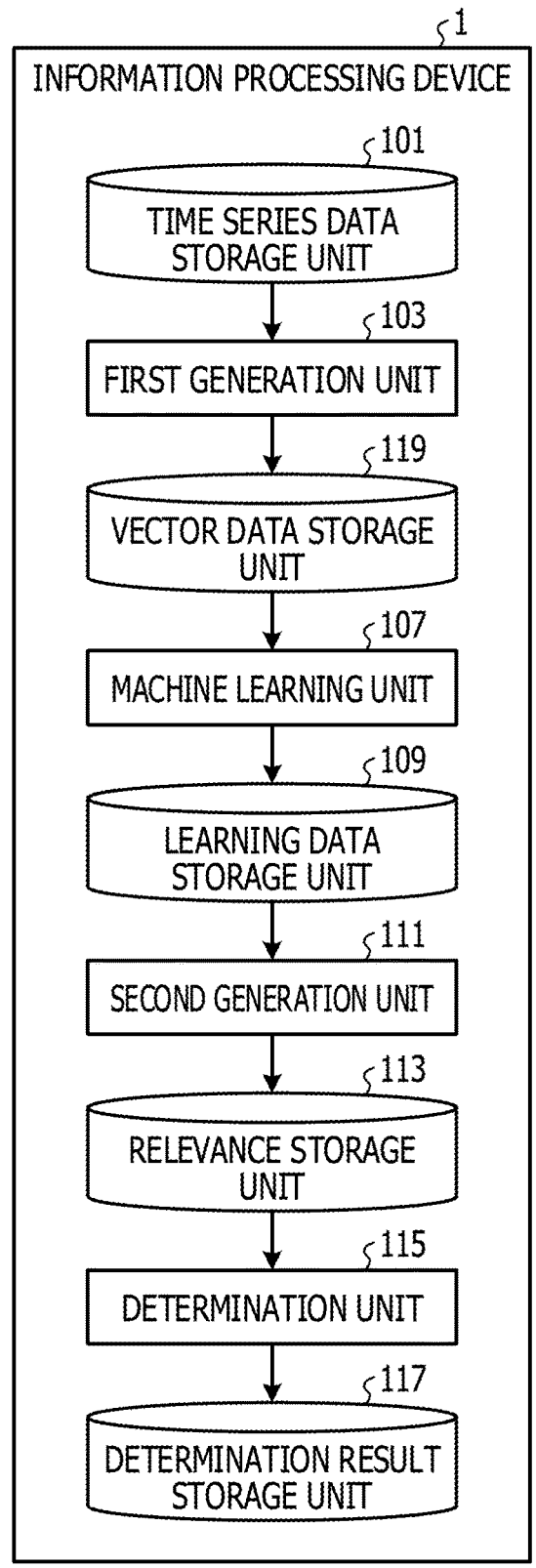
FIG. 32 is a functional block diagram of an information processing device according to a third embodiment.

FIG. 32 is a functional block diagram of an information processing device 1 according to the third embodiment. The information processing device 1 includes a time series data storage unit 101, a first generation unit 103, a vector data storage unit 119, a machine learning unit 107, a learning data storage unit 109, a second generation unit 111, a relevance storage unit 113, a determination unit 115, and a determination result storage unit 117.

The first generation unit 103, the machine learning unit 107, the second generation unit 111, and the determination unit 115 are realized, for example, by the CPU 2503 illustrated in FIG. 40 executing a program loaded into the memory 2501 illustrated in FIG. 40. The time series data storage unit 101, the vector data storage unit 119, the learning data storage unit 109, the relevance storage unit 113, and the determination result storage unit 117 are provided, for example, in the HDD 2505 or the memory 2501 illustrated in FIG. 40.

The first generation unit 103 executes processing based on data stored in the time series data storage unit 101, and then stores the processing result in the vector data storage unit 119. The machine learning unit 107 executes processing based on data stored in the vector data storage unit 119, and then stores the processing result in the learning data storage unit 109. The second generation unit 111 executes processing based on data stored in the learning data storage unit 109, and then stores the processing result in the relevance storage unit 113. The determination unit 115 executes processing based on data stored in the relevance storage unit 113, and then stores the processing result in the determination result storage unit 117.

Figure 33:
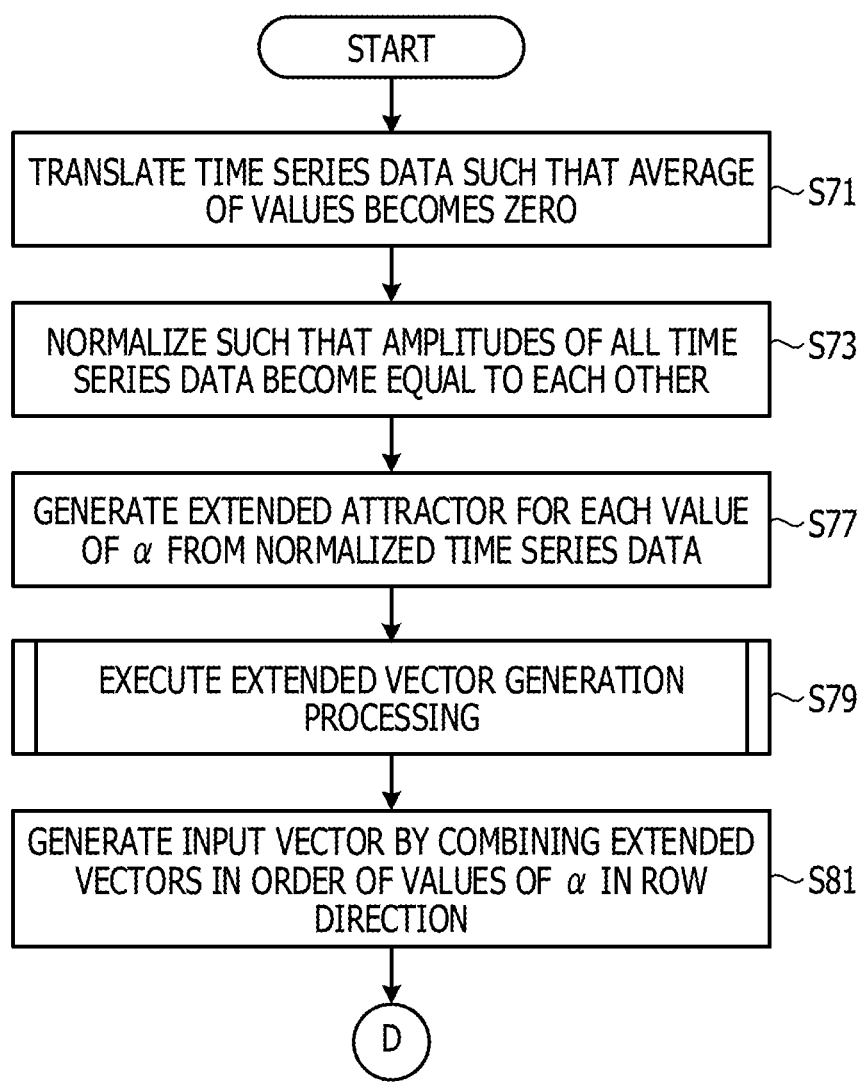
FIG. 33 is a flowchart illustrating a main processing flow of the third embodiment.

FIG. 33 is a flowchart illustrating a processing flow of processing executed by the information processing device 1 of the third embodiment.

The first generation unit 103 identifies one data set out of the plurality of data sets stored in the time series data storage unit 101. The first generation unit 103 then translates the plurality of pieces of time series data contained in the identified data set such that an average of the values of the plurality of pieces of time series data becomes zero (FIG. 33: Step S71).

The first generation unit 103 executes normalization such that the amplitudes of all the time series data on which the processing of Step S71 has been executed become equal to each other (Step S73).

The first generation unit 103 generates an extended attractor for each value of α from the plurality of pieces of normalized time series data (Step S77). The first generation unit 103 stores the generated extended attractor in the memory 2501. The generation of the extended attractor is the same as that in the first embodiment.

The first generation unit 103 performs extended vector generation processing using the extended attractor generated in Step S77 (Step S79). The extended vector generation processing is as described with reference to FIGS. 6 to 10B, and thus description thereof is omitted here.

The first generation unit 103 generates an input vector by combining the extended vectors generated in Step S79 in order of the value of α in a row direction (Step S81), and stores the generated input vector in the vector data storage unit 119. The processing then proceeds to Step S83 in FIG. 35 via Terminal D.

Figure 34:
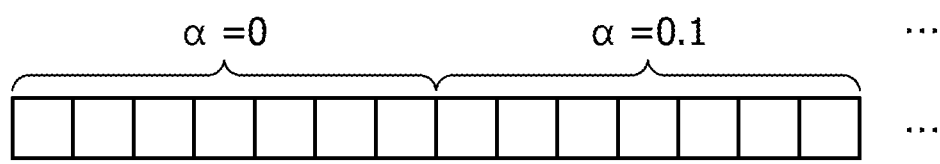
FIG. 34 is a diagram illustrating an example of an input vector.

FIG. 34 is a diagram illustrating an example of an input vector. The squares represent elements of the vector, and the Betti number is stored in each of the elements. In the example of FIG. 34, a vector having 7 elements corresponds to one extended vector. Such extended vectors are coupled to generate one input vector.

Figure 35:
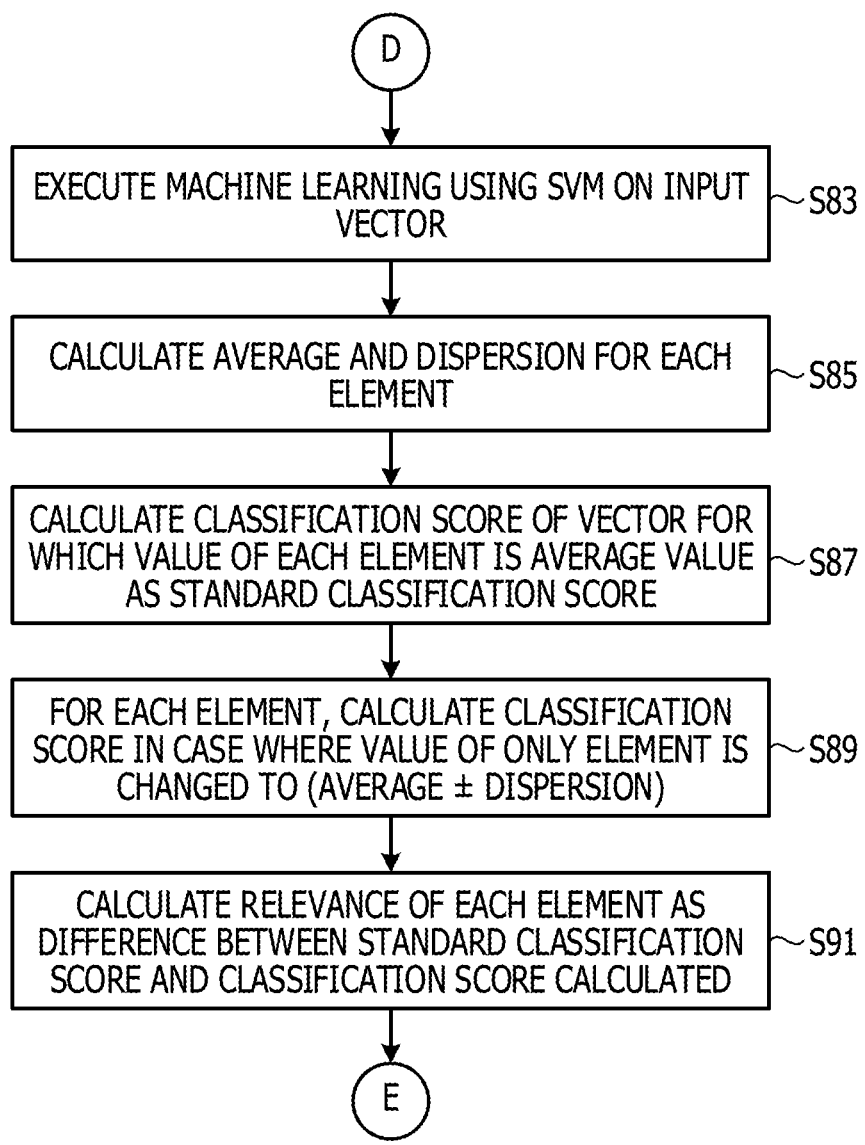
FIG. 35 is a flowchart illustrating a main processing flow of the third embodiment.

Transitioning to FIG. 35, the machine learning unit 107 executes machine learning using SVM on the input vector generated in Step S81 (Step S83). The machine learning unit 107 stores the result of the machine learning in the learning data storage unit 109.

Note that although an example in which the processing from Step S71 to S83 is executed on one data set out of a plurality of data sets has been illustrated for ease of explanation, the processing is actually executed on each of the plurality of data sets. Once it is confirmed that the machine learning is sufficiently conducted, the processing in and after Step S85 is executed.

The second generation unit 111 calculates an average value and dispersion of values for each element of the input vector (Step S85). Since executing the processing up to Step S83 on each of the plurality of data sets allows a plurality of input vectors to be generated, the average and dispersion of the values are calculated for each element.

The second generation unit 111 generates a vector having the average value calculated in Step S85 as a value of each element. Then, the second generation unit 111 calculates a classification score of the generated vector as a standard classification score, using the result of the machine learning using SVM (Step S87).

For each element of the vector generated in Step S87, the second generation unit 111 calculates a classification score in a case where the value of only this element is changed to (average+dispersion) or (average−dispersion), using the result of the machine learning using SVM (Step S89).

The second generation unit 111 calculates relevance of each element as the difference between the standard classification score and the classification score calculated in Step S89 (Step S91), and stores the calculated relevance in the relevance storage unit 113. The processing then proceeds to Step S93 in FIG. 36 via Terminal E.

Figure 36:
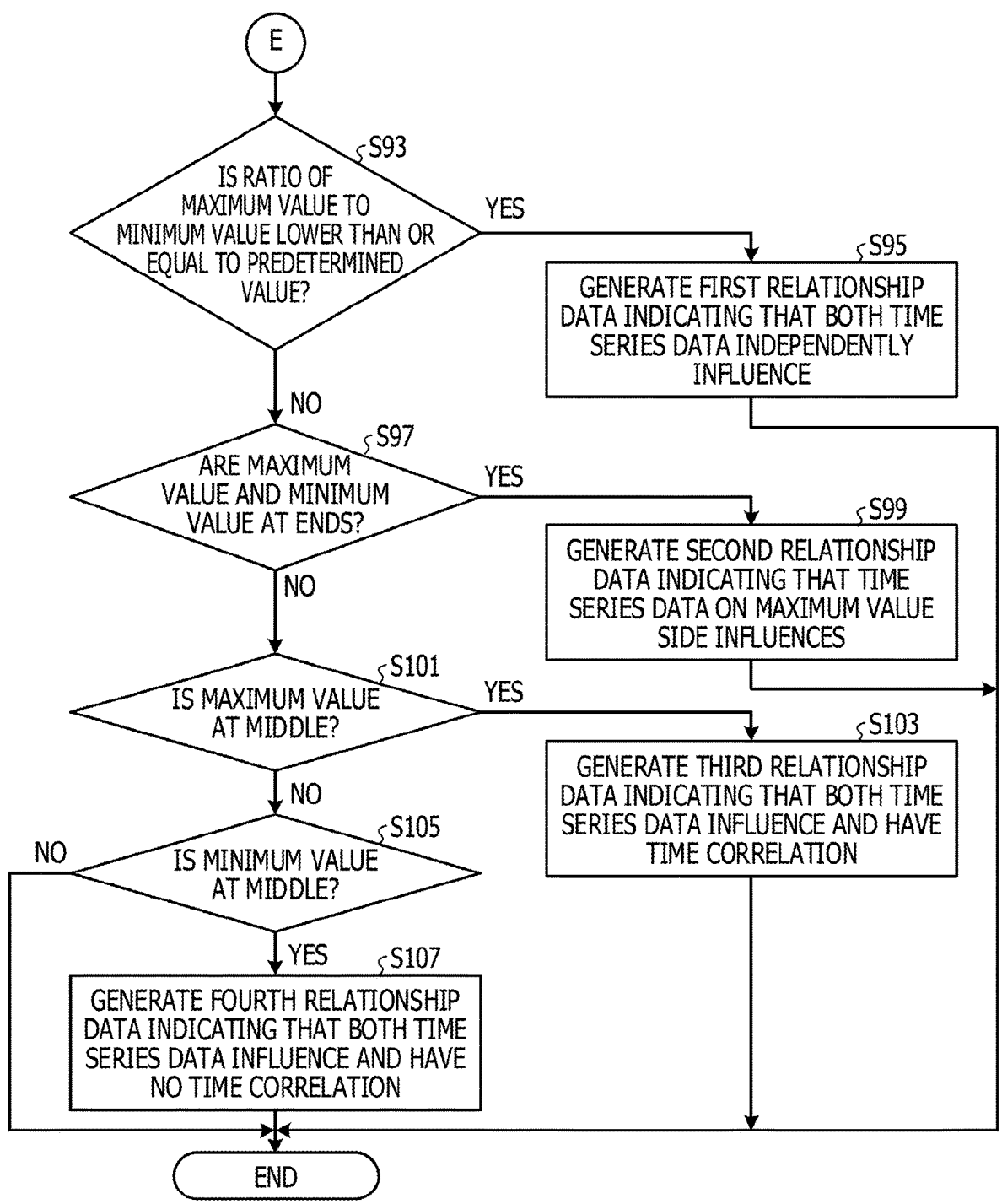
FIG. 36 is a flowchart illustrating a main processing flow of the third embodiment.

Transitioning to FIG. 36, the determination unit 115 reads information stored in the relevance storage unit 113. The determination unit 115 then determines whether the ratio of the maximum value to the minimum value is lower than or equal to a predetermined value (FIG. 36: Step S93). The predetermined value is, for example, 1.2. When the ratio of the maximum value to the minimum value is lower than or equal to the predetermined value, this means that the difference between maximum value and the minimum value is relatively small.

When the ratio of the maximum value to the minimum value is lower than or equal to the predetermined value (Step S93: Yes route), the determination unit 115 executes the processing described below. Specifically, the determination unit 115 generates first relationship data that indicates that both pieces of time series data each independently influence the classification (Step S95), and stores the first relationship data in the determination result storage unit 117. Then, the processing is terminated.

On the other hand, when the ratio of the maximum value to the minimum value is not lower than or equal to the predetermined value (Step S93: No route), the determination unit 115 executes the processing described below. Specifically, the determination unit 115 determines whether the maximum value and the minimum value are at ends of the relevance vector (Step S97).

When the maximum value and the minimum value are at ends of the relevance vector (Step S97: Yes route), the determination unit 115 executes the processing described below. Specifically, the determination unit 115 generates second relationship data that indicates that the time series data on the maximum value side influences the classification (Step S99), and stores the second relationship data in the determination result storage unit 117. Then, the processing is terminated.

On the other hand, when at least one of the maximum value and the minimum value is not at an end of the relevance vector (Step S97: No route), the determination unit 115 executes the processing described below. Specifically, the determination unit 115 determines whether the maximum value is at a middle of the relevance vector (Step S101).

When the maximum value is at the middle of the relevance vector (Step S101: Yes route), the determination unit 115 executes the processing described below. Specifically, the determination unit 115 generates third relationship data that indicates that both pieces of time series data influence the classification and that there is correlation between the time series data (Step S103), and stores the third relationship data in the determination result storage unit 117. Then, the processing is terminated.

On the other hand, when the maximum value is not at the middle of the relevance vector (Step S101: No route), the determination unit 115 executes the processing described below. Specifically, the determination unit 115 determines whether the minimum value is at the middle of the relevance vector (Step S105).

When the minimum value is at the middle of the relevance vector (Step S105: Yes route), the determination unit 115 executes the processing described below. Specifically, the determination unit 115 generates fourth relationship data that indicates that both pieces of time series data influence the classification and that there is no correlation between the time series data (Step S107), and stores the fourth relationship data in the determination result storage unit 117. Then, the processing is terminated. When the minimum value is not at the middle of the relevance vector (Step S105: No route), the processing is terminated. Note that relationship data stored in the determination result storage unit 117 is displayed on a display device or transmitted to another terminal to be checked by a user.

As described above, the machine learning using SVM makes it possible to identify correlation relationship between a plurality of pieces of time series data while enhancing the generalization performance. Note that although the relationship with the labels is not described for ease of explanation, the processing for each label may be executed also in the third embodiment.

Fourth Embodiment

Although in the first to third embodiments, relevance is calculated based on the result of machine learning, in the fourth embodiment, relevance is calculated by a method other than the machine learning.

Figure 37:
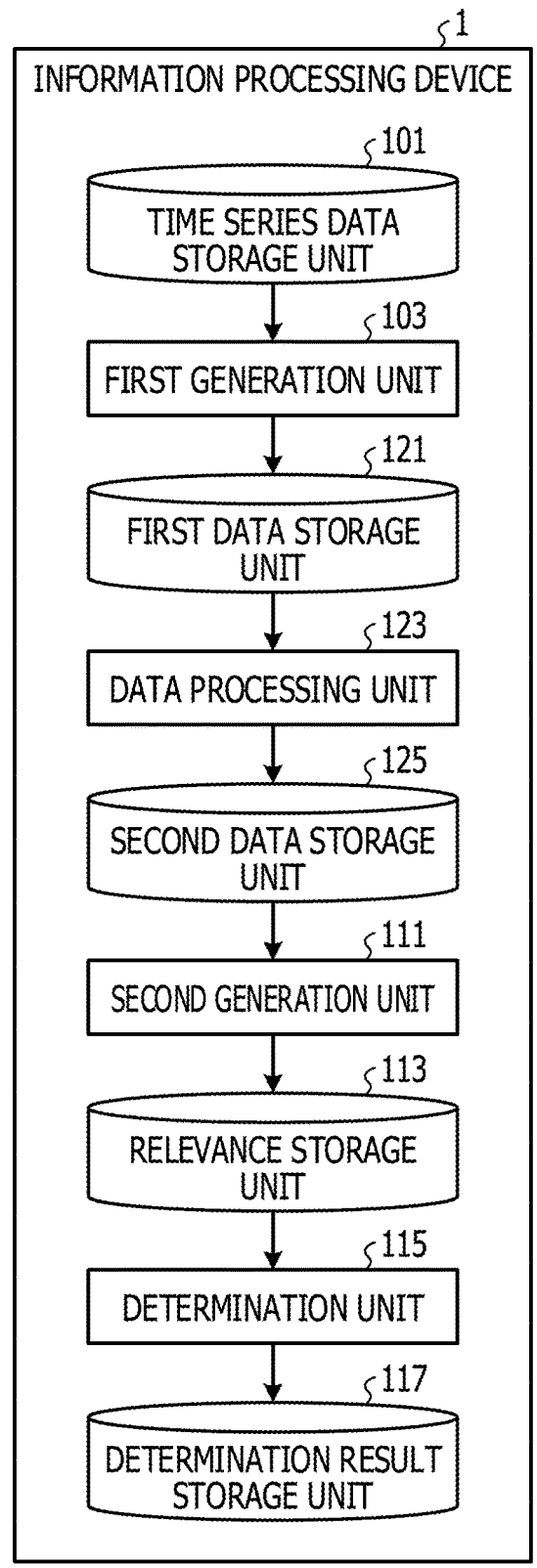
FIG. 37 is a functional block diagram of an information processing device according to a fourth embodiment.

FIG. 37 is a functional block diagram of an information processing device 1 according to the fourth embodiment. The information processing device 1 includes a time series data storage unit 101, a first generation unit 103, a first data storage unit 121, a data processing unit 123, a second data storage unit 125, a second generation unit 111, a relevance storage unit 113, a determination unit 115, and a determination result storage unit 117.

The first generation unit 103, the data processing unit 123, the second generation unit 111, and the determination unit 115 are realized, for example, by the CPU 2503 illustrated in FIG. 40 executing a program loaded into the memory 2501 illustrated in FIG. 40. The time series data storage unit 101, the first data storage unit 121, the second data storage unit 125, the relevance storage unit 113, and the determination result storage unit 117 are provided, for example, in the HDD 2505 or the memory 2501 illustrated in FIG. 40.

The first generation unit 103 executes processing based on data stored in the time series data storage unit 101, and then stores the processing result in the first data storage unit 121. The data processing unit 123 executes processing based on data stored in the first data storage unit 121, and then stores the processing result in the second data storage unit 125. The second generation unit 111 executes processing based on data stored in the second data storage unit 125, and then stores the processing result in the relevance storage unit 113. The determination unit 115 executes processing based on data stored in the relevance storage unit 113, and then stores the processing result in the determination result storage unit 117.

Figure 38:
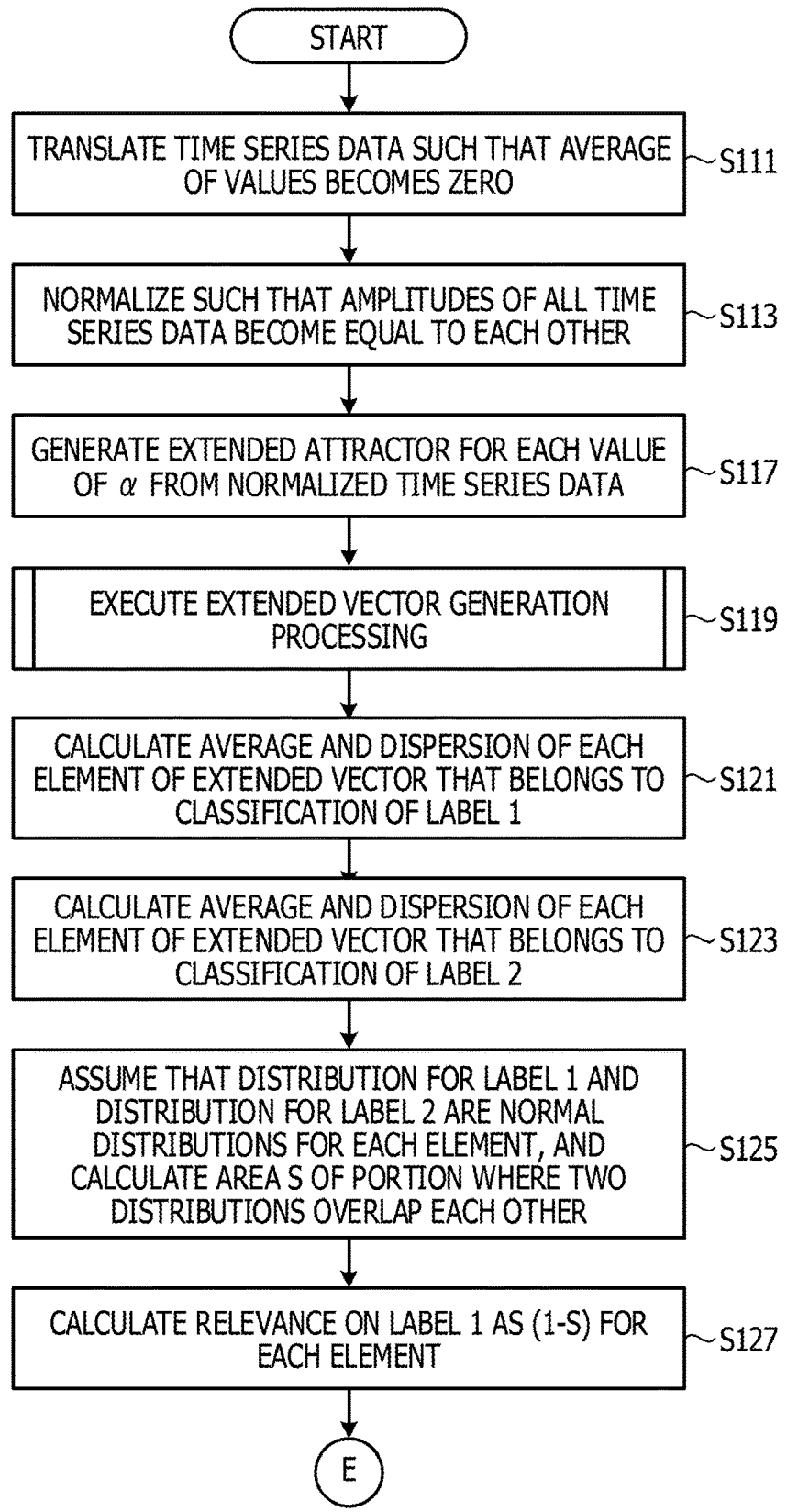
FIG. 38 is a flowchart illustrating a main processing flow of the fourth embodiment.

FIG. 38 is a flowchart illustrating a processing flow of processing executed by the information processing device 1 of the fourth embodiment. Here, the processing is described on the assumption that there are two labels.

The first generation unit 103 identifies one data set out of the plurality of data sets stored in the time series data storage unit 101. The first generation unit 103 then translates the plurality of pieces of time series data contained in the identified data set such that an average of the values of the plurality of pieces of time series data becomes zero (FIG. 38: Step S111).

The first generation unit 103 executes normalization such that the amplitudes of all the time series data on which the processing of Step S111 has been executed become equal to each other (Step S113).

The first generation unit 103 generates an extended attractor for each value of $\alpha$ from the plurality of pieces of normalized time series data (Step S117). The first generation unit 103 stores the generated extended attractor in the memory 2501. The generation of the extended attractor is the same as that in the first embodiment.

The first generation unit 103 performs extended vector generation processing using the extended attractor generated in Step S117 (Step S119). The extended vector generation processing is as described with reference to FIGS. 6 to 10B, and thus description thereof is omitted here.

Note that although an example in which the processing from Step S111 to S119 is executed on one data set out of a plurality of data sets has been illustrated for ease of explanation, the processing is actually executed on each of the plurality of data sets to generate a plurality of extended vectors.

Then, the data processing unit 123 calculates an average and dispersion of each element of an extended vector that belongs to the classification of a label 1 among a plurality of extended vectors stored in the first data storage unit 121 in the processing of Step S119 (Step S121).

The data processing unit 123 calculates an average and dispersion of each element of an extended vector that belongs to the classification of a label 2 among the plurality of extended vectors stored in the first data storage unit 121 in the processing of Step S119 (Step S123).

Figure 39:
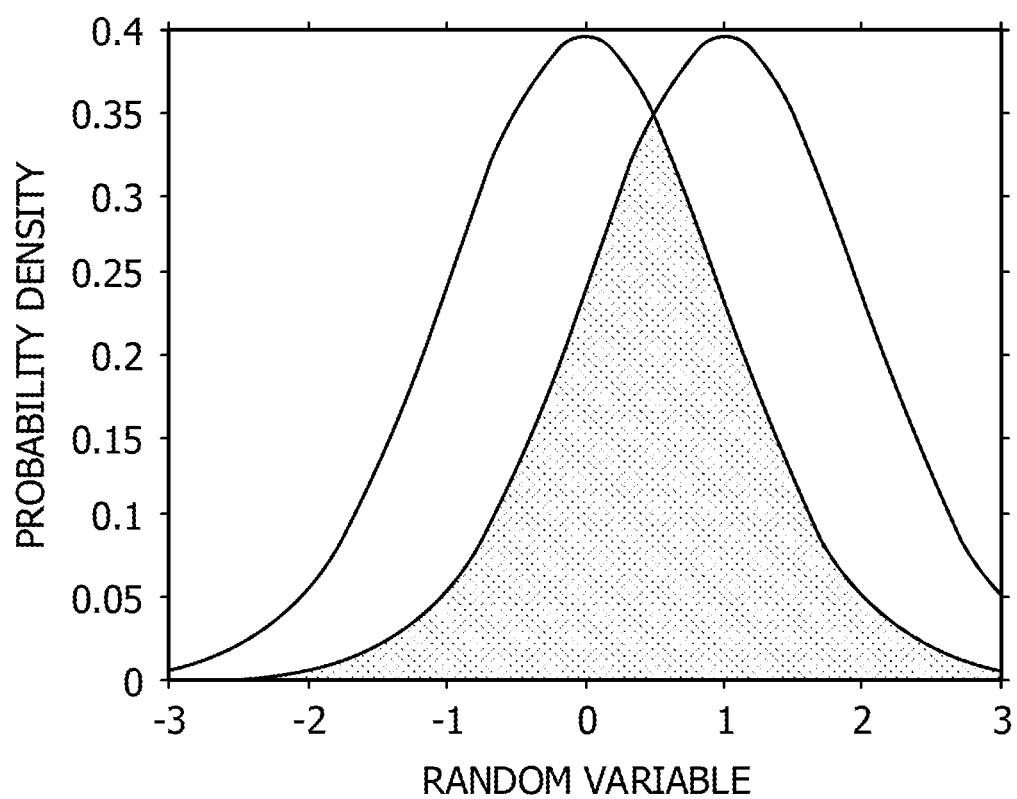
FIG. 39 is a graph for explaining calculation of relevance in the fourth embodiment.

The data processing unit 123 assumes that distribution for the label 1 and distribution for the label 2 are normal distributions for each element, and calculates the area S of a portion where the two normal distributions overlap each other (Step S125). The data processing unit 123 stores the area S for each element in the second data storage unit 125. In Step S125, regarding two normal distributions as illustrated in FIG. 39, for example, the area S of the portion where these normal distributions overlap each other (the hatched portion) is calculated for each element. Note that in FIG. 39, the horizontal axis represents random variable and the vertical axis represents probability density.

The second generation unit 111 calculates relevance on the label 1 as (1-S) (Step S127), and stores the relevance on the label 1 in the relevance storage unit 113. Note that relevance on the label 2 is also calculated as (1-S) in the same manner and is stored in the relevance storage unit 113. When the number of labels is 3 or more, the relevance on the label 1 is calculated as an average value of relevance of the other labels. For example, when the number of labels is 3, the relevance on the label 1 is calculated as an average value of the relevance on the label 2 and the relevance on the label 3.

Relevance vectors on the label 1 and the label 2 are generated by the processing in Step S127. After that, the processing after Terminal E illustrated in FIG. 36 is executed on each label.

Executing the above-described processing makes it possible to identify correlation between a plurality of pieces of time series data even when machine learning is not executed.

Although the embodiments have been described above, the present disclosure is not limited thereto. For example, the functional block configuration of the information processing device 1 described above may not correspond to an actual program module configuration.

Moreover, the data configuration described above is just an example, and the present disclosure is not limited thereto. Furthermore, as for the processing flow, the processing order may be changed as long as the processing result is not changed. Furthermore, the processing may be executed in parallel.

Note that the information processing device 1 described above is a computer device, as illustrated in FIG. 40, in which the memory 2501, the CPU 2503, the HDD 2505, a display control unit 2507 connected to a display device 2509, a drive device 2513 for a removable disk 2511, an input device 2515, and a communication control unit 2517 for connecting to a network are connected through a bus 2519. An operating system (OS: Operating system) and application programs to perform the processing in this embodiment are stored in the HDD 2505 and read from the HDD 2505 into the memory 2501 when executed by the CPU 2503. The CPU 2503 controls the display control unit 2507, the communication control unit 2517, and the drive device 2513, according to processing contents of the application programs, to perform predetermined operations. Moreover, data that is being processed is basically stored in the memory 2501, but may be stored in the HDD 2505. In the embodiments, the application program for performing the processing described above is distributed while being stored in the computer-readable removable disk 2511 and installed into the HDD 2505 from the drive device 2513. The application program may be installed into the HDD 2505 through a network such as the Internet and the communication control unit 2517. Such a computer device realizes various functions as described above through organic cooperation between hardware such as the CPU 2503 and the memory 2501 described above and the OS and programs such as application programs.

The above embodiments are summarized as follows.

A data generation method according to a first aspect of the present embodiment includes: (A) a process of generating a Betti number series corresponding to a contribution rate by performing persistent homology processing on a set of points generated by using a plurality of pieces of time series data and the contribution rate of each of the plurality of pieces of time series data, each of the points being represented by coordinates; (B) a process of generating a characteristic image from a plurality of the Betti number series generated for the plurality of contribution rates; and (C) a process of generating machine learning data in which the characteristic image and a classification corresponding to the plurality of pieces of time series data are associated with each other.

This makes it possible to generate characteristic information suitable for machine learning on a plurality of pieces of time series data.

In addition, the data generation method may further include: (D) a process of generating first data based on the generated machine learning data, the first data being data on a relationship between relevance and the contribution rate, the relevance indicating a degree of influence on a specific classification among a plurality of the classifications; and (E) a process of generating second data on the specific classification based on the first data, the second data being data on a correlation between the plurality of pieces of time series data.

This make it possible to identify a correlation between the plurality of pieces of time series data for a specific classification.

The machine learning data may be machine learning data based on a convolutional neural network. The process of generating the first data may include (d1) calculating relevance on the specific classification, for each of values of the plurality of contribution rates, based on absolute values of elements of a weighting matrix between a last characteristic layer and an identification layer contained in the machine learning data.

Since in machine learning based on a convolutional neural network, a positional relationship between pixels contained in a characteristic image is taken into consideration as compared to other machine learning, this makes it possible to improve classification performance of the machine learning. Since the weighting matrix between the last characteristic layer and the identification layer directly influences each classification in the identification layer, executing the above-described process makes it possible to appropriately calculate relevance for a specific classification in the identification layer.

The machine learning data may be machine learning data based on a single-layer learning model.

This makes it possible to execute learning directly on the first data.

The process of generating second data may include (e1) generating first relationship data, second relationship data, third relationship data, or fourth relationship data, based on a maximum value and a minimum value of relevance contained in the first data as well as positions of the maximum value and the minimum value, the first relationship data indicating that each of the plurality of pieces of time series data independently influences the specific classification, the second relationship data indicating that any of the plurality of pieces of time series data influences the specific classification, the third relationship data indicating that each of the plurality of pieces of time series data influences the specific classification and that the plurality of pieces of time series data have time correlation, the fourth relationship data indicating that each of the plurality of pieces of time series data influences the specific classification and that the plurality of pieces of time series data have no time correlation.

The process of generating second data may include: (e11) generating the first relationship data when a ratio of the maximum value to the minimum value is lower than or equal to a predetermined value, (e12) generating the second relationship data when the maximum value and the minimum value are at ends of a column of relevance contained in the first data, (e13) generating the third relationship data when the maximum value is at a middle of the column of relevance contained in the first data, and (e14) generating the fourth relationship data when the minimum value is at a middle of the column of relevance contained in the first data.

The plurality of pieces of time series data may be a plurality of pieces of normalized time series data.

This makes it possible to equally handle a plurality of pieces of time series data.

A data generation device according to a second aspect of the present embodiment includes: (F) a first generation unit (the first generation unit 103 in the embodiment is an example of the first generation unit) that generates a Betti number series corresponding to a contribution rate by performing persistent homology processing on a set of points generated by using a plurality of pieces of time series data and the contribution rate of each of the plurality of pieces of time series data, each of the points being represented by coordinates and that generates a characteristic image from a plurality of the Betti number series generated for the plurality of contribution rates; and (G) a second generation unit (the machine learning unit 107 in the embodiment is an example of the second generation unit) that generates machine learning data in which the characteristic image and a classification corresponding to the plurality of pieces of time series data are associated with each other.

Note that a program for causing a processor to perform the processing by the above method may be created. This program is stored, for example, in a computer-readable storage medium such as a flexible disk, a CD-ROM, a magneto optical disk, a semiconductor memory, and a hard disk, or in a storage device. Note that intermediate processing results are temporarily stored in a storage device such as a main memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data generation method comprising:
executing a first generation process that includes generating a Betti number series corresponding to a contribution rate by performing persistent homology processing on a first point set, the first point set being generated by using a plurality of pieces of time series data and the contribution rate of each of the plurality of pieces of time series data, each of points included in the first point set being represented by coordinates;
executing a second generation process that includes generating a characteristic image from a plurality of the Betti number series, the plurality of Betti number series being generated by performing the first generation process on each of the plurality of contribution rates; and
executing a third generation process that includes generating machine learning data in which the characteristic image and a classification corresponding to the plurality of pieces of time series data are associated with each other.

2. The data generation method according to claim 1, further comprising:
executing a fourth generation process that includes generating first data based on the generated machine learning data, the first data being data on a relationship between relevance and the contribution rate, the relevance indicating a degree of influence on a specific classification among a plurality of the classifications; and
executing a fifth generation process that includes generating second data on the specific classification based on the first data, the second data being data on a correlation between the plurality of pieces of time series data.

3. The data generation method according to claim 2, wherein the machine learning data is machine learning data based on a convolutional neural network, and wherein the fourth generation process is configured to calculate relevance on the specific classification, for each of values of the plurality of contribution rates, based on absolute values of elements of a weighting matrix between a last characteristic layer and an identification layer contained in the machine learning data.

4. The data generation method according to claim 1, wherein the machine learning data is machine learning data based on a single-layer learning model.

5. The data generation method according to claim 2, wherein the fifth generation process is configured to generate a plurality of pieces of relationship data based on a maximum value and a minimum value of relevance contained in the first data as well as positions of the maximum value and the minimum value, the plurality of pieces of relationship data including any of first relationship data, second relationship data, third relationship data, and fourth relationship data, the first relationship data being data indicating that each of the plurality of pieces of time series data independently influences the specific classification, the second relationship data being data indicating that any of the plurality of pieces of time series data influences the specific classification, the third relationship data being data indicating that each of the plurality of pieces of time series data influences the specific classification and that the plurality of pieces of time series data have time correlation, the fourth relationship data being data indicating that each of the plurality of pieces of time series data influences the specific classification and that the plurality of pieces of time series data have no time correlation.

6. The data generation method according to claim 5, wherein the fifth generation process is configured to generate the first relationship data when a ratio of the maximum value to the minimum value is lower than or equal to a predetermined value,
generate the second relationship data when the maximum value and the minimum value are at ends of a column of relevance contained in the first data,
generate the third relationship data when the maximum value is at a middle of the column of relevance contained in the first data, and
generate the fourth relationship data when the minimum value is at a middle of the column of relevance contained in the first data.

7. The data generation method according to claim 1, wherein the plurality of pieces of time series data are a plurality of pieces of normalized time series data.

8. An apparatus of data generation, the apparatus comprising:
- a memory; and
- a processor coupled to the memory, the processor being configured to
- execute a first generation process that includes generating a Betti number series corresponding to a contribution rate by performing persistent homology processing on a first point set, the first point set being generated by using a plurality of pieces of time series data and the contribution rate of each of the plurality of pieces of time series data, each of points included in the first point set being represented by coordinates;
- execute a second generation process that includes generating a characteristic image from a plurality of the Betti number series, the plurality of Betti number series being generated by performing the first generation process on each of the plurality of contribution rates; and
- execute a third generation process that includes generating machine learning data in which the characteristic image and a classification corresponding to the plurality of pieces of time series data are associated with each other.

9. A non-transitory computer-readable storage medium storing a program which causes a processor to perform processing of data generation, the processing comprising:
- executing a first generation process that includes generating a Betti number series corresponding to a contribution rate by performing persistent homology processing on a first point set, the first point set being generated by using a plurality of pieces of time series data and the contribution rate of each of the plurality of pieces of time series data, each of points included in the first point set being represented by coordinates;
- executing a second generation process that includes generating a characteristic image from a plurality of the Betti number series, the plurality of Betti number series being generated by performing the first generation process on each of the plurality of contribution rates; and
- executing a third generation process that includes generating machine learning data in which the characteristic image and a classification corresponding to the plurality of pieces of time series data are associated with each other.

* * * * *